United States Patent
Lim et al.

(10) Patent No.: US 9,948,406 B2
(45) Date of Patent: Apr. 17, 2018

(54) USER EQUIPMENT COMPRISING A TRANSCEIVER CAPABLE OF REMOVING SELF-INTERFERENCE AND METHOD THEREFOR

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 117 days.

(21) Appl. No.: 14/900,998

(22) PCT Filed: Jul. 17, 2014

(86) PCT No.: PCT/KR2014/006514
§ 371 (c)(1),
(2) Date: Dec. 22, 2015

(87) PCT Pub. No.: WO2015/009084
PCT Pub. Date: Jan. 22, 2015

(65) Prior Publication Data
US 2016/0156423 A1    Jun. 2, 2016

Related U.S. Application Data

(60) Provisional application No. 61/856,069, filed on Jul. 19, 2013, provisional application No. 61/856,051, filed on Jul. 19, 2013.

(51) Int. Cl.
*H04L 5/00* (2006.01)
*H04B 1/525* (2015.01)
(Continued)

(52) U.S. Cl.
CPC ............ *H04B 15/00* (2013.01); *H04B 1/525* (2013.01); *H04L 5/14* (2013.01)

(58) Field of Classification Search
CPC .... H04W 76/023; H04W 24/10; H04W 92/18
(Continued)

(56) References Cited

U.S. PATENT DOCUMENTS 8,588,690 B2 * 11/2013 Turtinen ............... H04W 8/005
                                                    370/328
9,480,026 B2 * 10/2016 Kwak ................. H04W 52/367
(Continued)

FOREIGN PATENT DOCUMENTS

KR    20070113680 A  * 11/2007
KR    10-2010-0021383    2/2010
(Continued)

OTHER PUBLICATIONS

Chang, et al., "A Self Interference Cancellation Method in OFDM-based Full Duplex Relay," Korea Information and Communications Society, Conference Journal Fall 2010, pp. 348-351.
(Continued)

*Primary Examiner* — Charles C Jiang
*Assistant Examiner* — Will Lin
(74) *Attorney, Agent, or Firm* — Lee Hong Degerman Kang & Waimey

(57) ABSTRACT

With increasing user requirements for social networking services (SNS), communication between user equipments (UEs) at a physically close distance, i.e., device to device (D2D) communication, is needed. D2D communication is performed on the basis of the discovery between UEs. However, D2D communication between UEs may cause interference to communication with an existing system, i.e., a base station. Thus, one aspect of the present invention
(Continued)

provides a user equipment comprising a transceiver capable of removing self-interference.

10 Claims, 27 Drawing Sheets

(51) Int. Cl.
*H04B 15/00* (2006.01)
*H04L 5/14* (2006.01)

(58) Field of Classification Search
USPC .......................................... 455/78; 370/276
See application file for complete search history.

(56) References Cited

U.S. PATENT DOCUMENTS

| | | | |
|---|---|---|---|
| 2004/0097209 A1* | 5/2004 | Haub .................... | H03G 3/001 455/242.1 |
| 2006/0035601 A1* | 2/2006 | Seo ........................ | H04B 1/40 455/78 |
| 2008/0039042 A1* | 2/2008 | Ciccarelli .............. | H04B 1/109 455/234.1 |
| 2008/0089397 A1 | 4/2008 | Vetter et al. | |
| 2009/0180466 A1* | 7/2009 | Soul ........................ | H03J 7/04 370/350 |
| 2011/0117854 A1* | 5/2011 | Ruelke .................... | H04B 3/30 455/63.1 |
| 2013/0083703 A1* | 4/2013 | Granger-Jones ....... | H04B 1/525 370/277 |
| 2013/0155912 A1* | 6/2013 | Khojastepour ... | H04W 72/0413 370/277 |
| 2013/0163488 A1* | 6/2013 | Kwon ..................... | H04B 1/58 370/297 |
| 2013/0258915 A1* | 10/2013 | Kannari ................. | H04L 5/143 370/281 |
| 2014/0209678 A1* | 7/2014 | Factor ..................... | G01S 7/38 235/400 |

FOREIGN PATENT DOCUMENTS

| | | |
|---|---|---|
| KR | 10-2011-0104806 | 9/2011 |
| KR | 10-2012-0131184 | 12/2012 |

OTHER PUBLICATIONS

PCT International Application No. PCT/KR2014/006514, Written Opinion of the International Searching Authority dated Oct. 17, 2014, 1 page.

\* cited by examiner (b) MULTIPLE CCS (a) SINGLE CC (a)

(b)

USER EQUIPMENT COMPRISING A TRANSCEIVER CAPABLE OF REMOVING SELF-INTERFERENCE AND METHOD THEREFOR

CROSS-REFERENCE TO RELATED APPLICATIONS

This application is the National Stage filing under 35 U.S.C. 371 of International Application No. PCT/KR2014/006514, filed on Jul. 17, 2014, which claims the benefit of U.S. Provisional Application Nos. 61/856,069, filed on Jul. 19, 2013, and 61/856,051, filed on Jul 19, 2013, the contents of which are all hereby incorporated by reference herein in their entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8.

In 3GPP LTE, OFDMA (orthogonal frequency division multiple access) is used for downlink, and SC-FDMA (single carrier-frequency division multiple access) is used for uplink. To understand OFDMA, OFDM should be known. OFDM may attenuate inter-symbol interference with low complexity and is in use. OFDM converts data serially input into N parallel data pieces and carries the data pieces over N orthogonal sub-carriers. The sub-carriers maintain orthogonality in view of frequency. Meanwhile, OFDMA refers to a multiple access scheme that realizes multiple access by independently providing each user with some of sub-carriers available in the system that adopts OFDM as its modulation scheme.

FIG. 1 illustrates a 3GPP LTE wireless communication system.

As can be seen from FIG. 1, the wireless communication system includes at least one base station (BS) 20. Each base station 20 offers a communication service in a specific geographical area (generally denoted cell) 20a, 20b, and 20c.

At this time, communication from the base station to a terminal is denoted downlink (DL), and communication from the terminal to the base station is denoted uplink (UL).

Meanwhile, with increasing users demands for social networking services (SNSs), communication between UEs at a physically close distance, that is, device-to-device (D2D) communication, is needed. D2D communication is performed on the basis of discovery between UEs.

However, D2D communication between UEs may cause interference to communication with an existing system, that is, a base station.

SUMMARY OF THE INVENTION

Accordingly, the disclosure of the specification has been made in an effort to solve the problem.

In order to achieve the aforementioned purpose, the present specification provides a user equipment (UE). The UE may comprise: a first radio frequency (RF) chain configured to process a first reception signal and a second reception signal; a second RF chain configured to process a transmission signal; a duplexer to output the first reception signal to the first RF chain and to output the second reception signal to the second RF chain; a directional coupler connected between the duplexer and the second RF chain to output the transmission signal from the second RF chin to the duplexer and to output the second reception signal input from the duplexer to the first RF chain; a self-interference removing filter to remove the transmission signal from the second RF chain leaking into the second reception signal input from the directional coupler to output a signal; and an accumulator connected to the self-interference removing filter and the first RF chain to accumulate the second reception signal output from the self-interference removing filter and the first reception signal and to input an accumulated signal to the first RF chain.

The first RF chain may comprise a low-noise amplifier to amplify the accumulated signal obtained by accumulating the first reception signal and the second reception signal by the accumulator, and a composition unit connected to the low-noise amplifier to remove a carrier to output a signal.

The first RF chain may further comprise a filter to remove an unnecessary component from an output from the composition unit.

The second RF chain may comprise a composition unit to compose a baseband signal with a carrier and an amplifier to amplify a signal output from the composition unit.

The second RF chain may further comprise a filter to remove an unnecessary component from the baseband signal and to output the signal to the composition unit.

The UE may further comprise: a second low-noise amplifier connected between the self-interference removing filter and the accumulator to amplify the second reception signal output from the self-interference removing filter and to transmit the second reception signal to the accumulator. In this case, the first RF chain may comprise a first low-noise amplifier to amplify the first reception signal, the accumulator to accumulate the first reception signal passing through the first low-noise amplifier and the second reception signal passing through the second-low noise amplifier, and a composition unit to remove a carrier from a signal obtained by accumulating the first reception signal and the second reception signal by the accumulator and to output a signal.

The first reception signal is a reception signal from a base station, the second reception signal is a device-to-device (D2D) reception signal from an adjacent UE, and the transmission signal comprises at least one of a transmission signal to the base station and a D2D transmission signal to the adjacent UE.

In order to achieve the aforementioned purpose, the present specification provides a transceiving method of a user equipment (UE). The method may comprise: processing and transmitting a transmission signal; receiving at least one of a first reception signal and a second reception signal; removing the transmission signal leaking into the second reception signal when transmission of the transmission signal is performed simultaneously with reception of the second reception signal; and accumulating the first reception signal and the second reception signal and processing the accumulated first and second reception signals when the first and second reception signals are received simultaneously.

An aspect of the present invention can remove interference between direct communication between user equipments (UEs), that is, device-to-device (D2D) communication, and cellular communication, that is, communication with a base station.

BRIEF DESCRIPTION OF THE DRAWINGS

FIG. 16b illustrates an example of a solution for the case illustrated in FIG. 16a.

DESCRIPTION OF EXEMPLARY EMBODIMENTS

Figure 1:
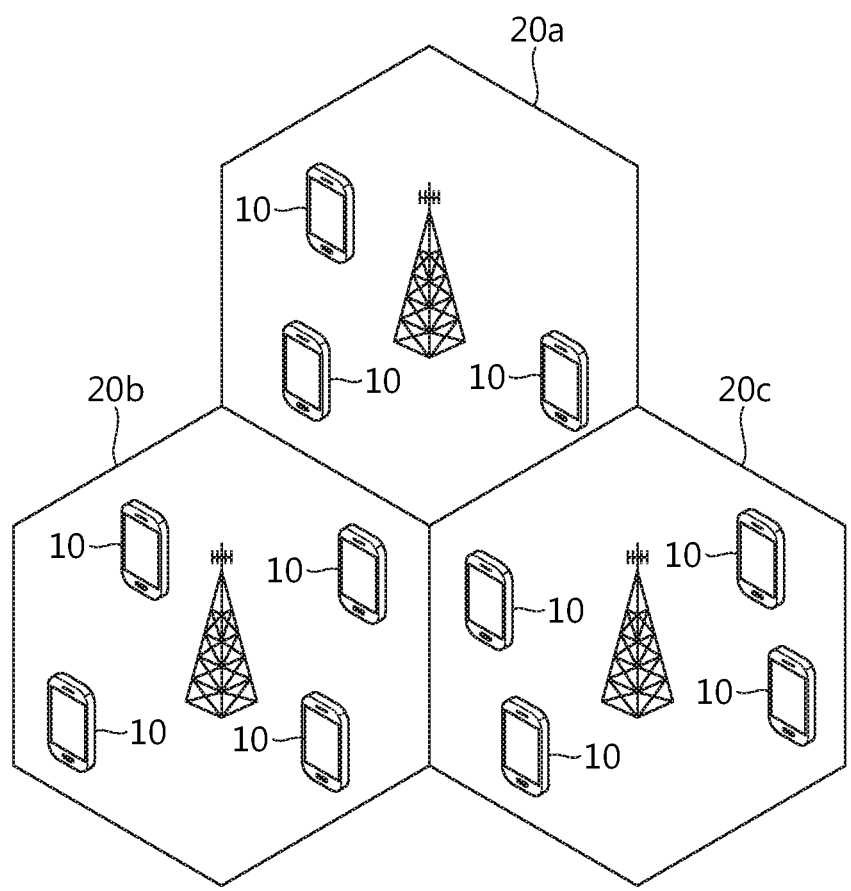
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

Meanwhile, the LTE system defined by the 3GPP adopted such MIMO. Hereinafter, the LTE system is described in further detail.

Figure 2:
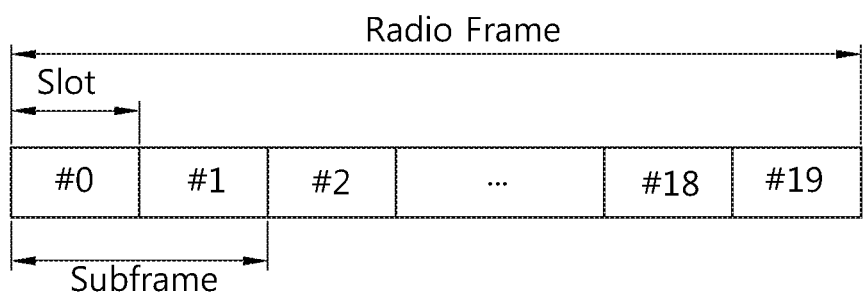
FIG. 2 illustrates the architecture of a radio frame according to frequency-division duplexing (FDD) in 3rd Generation Partnership Project (3GPP) Long-Term Evolution (LTE).

FIG. 2 illustrates the architecture of a radio frame according to FDD in 3GPP LTE.

For the radio frame shown in FIG. 2, 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)", Ch. 5 may be referenced.

Referring to FIG. 2, the radio frame consists of 10 sub-frames, and each sub-frame includes two slots. The slots in the radio frame are numbered with slot numbers 0 to 19. The time taken for one sub-frame to be transmitted is denoted TTI (transmission time interval). The TTI may be a scheduling unit for data transmission. For example, the length of one radio frame is 10 ms, the length of one sub-frame is 1 ms, and the length of one slot may be 0.5 ms.

The architecture of radio frame is merely an example, and the number of sub-frames in the radio frame or the number of slots in each sub-frame may be changed variously.

Meanwhile, one slot may include a plurality of OFDM symbols. How many OFDM symbols are included in one slot may vary depending on cyclic prefix (CP).

Figure 3:
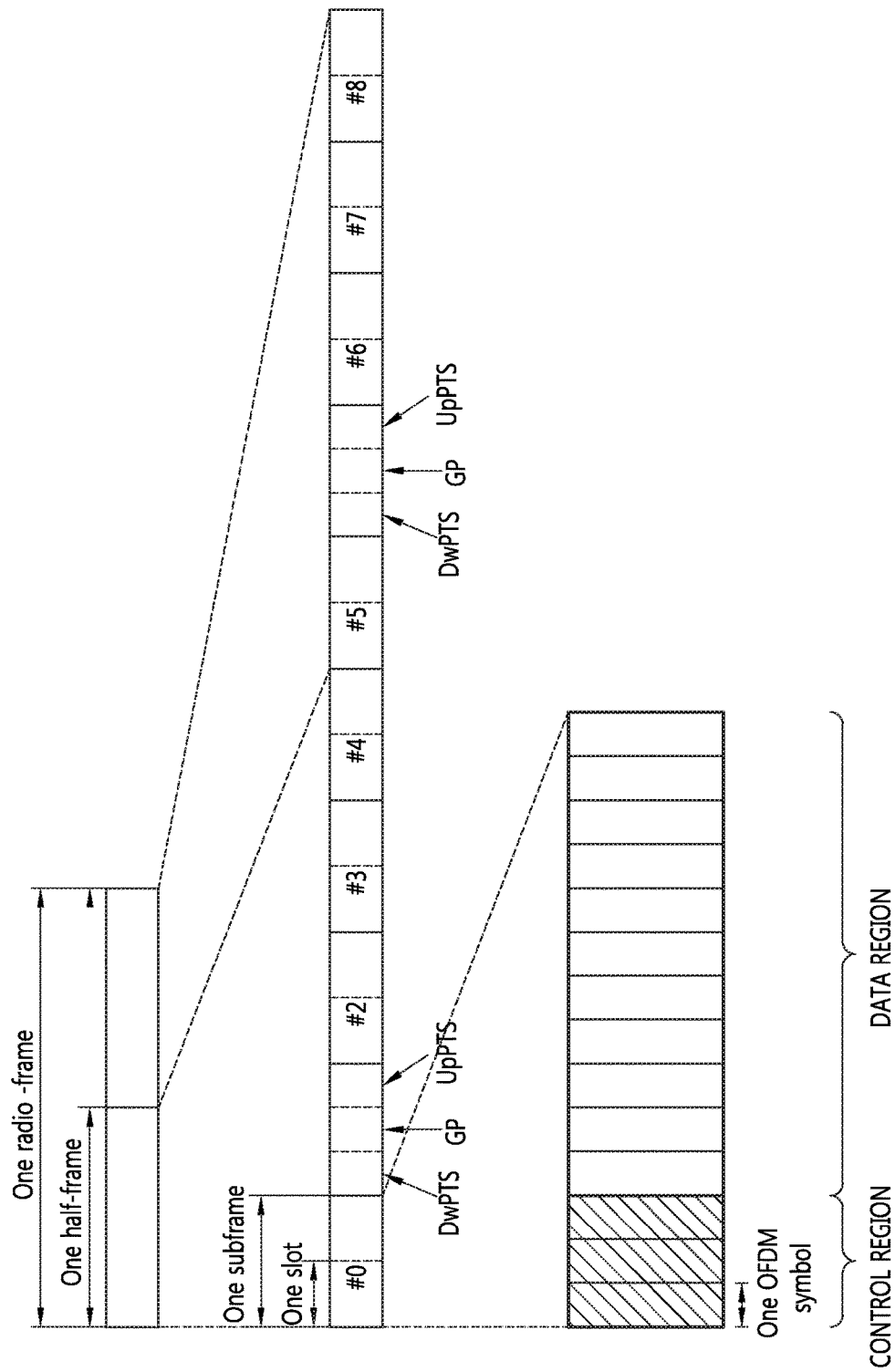
FIG. 3 illustrates the architecture of a downlink radio frame according to time division duplexing (TDD) in 3GPP LTE.

FIG. 3 illustrates the architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
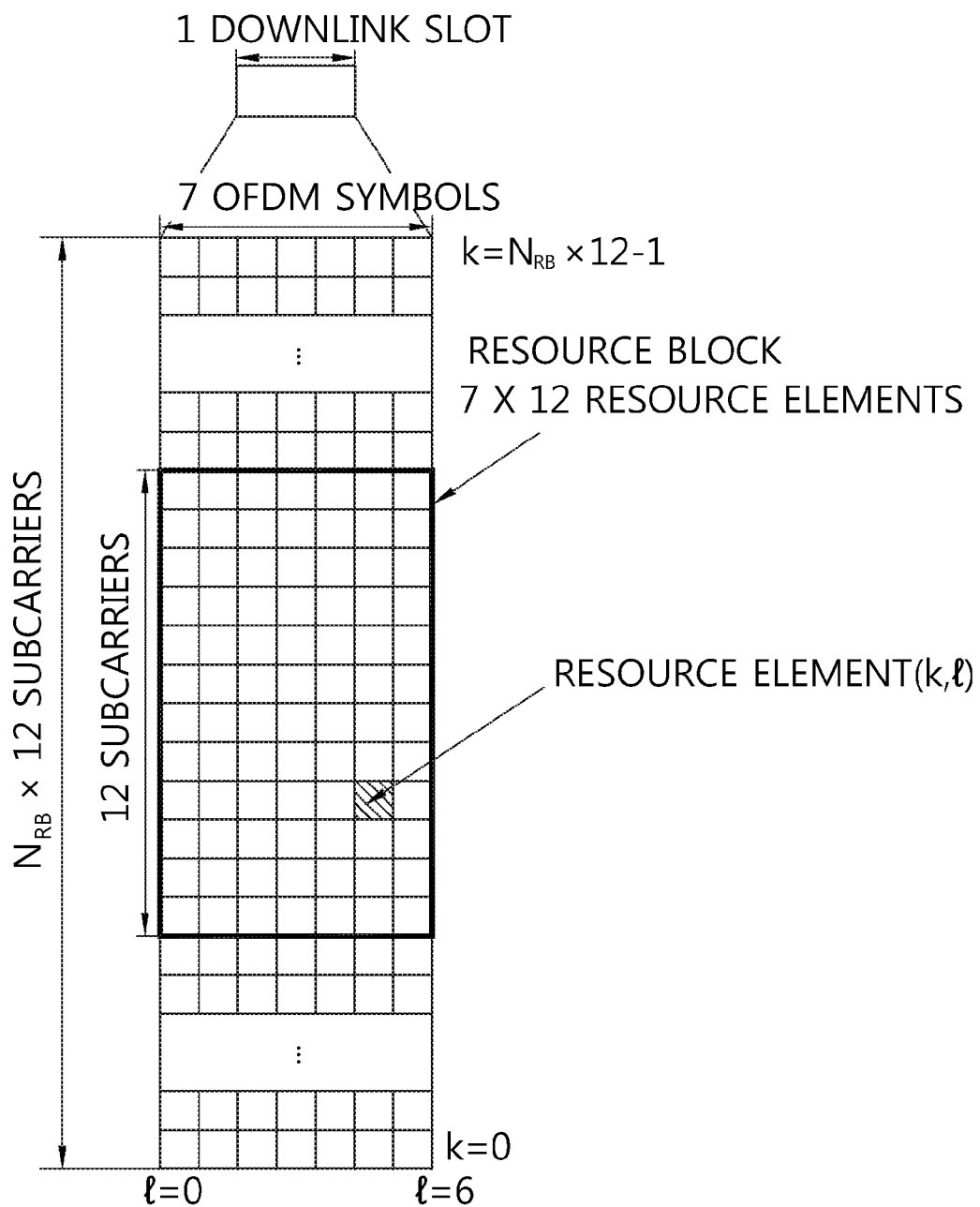
FIG. 4 illustrates an example of a resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
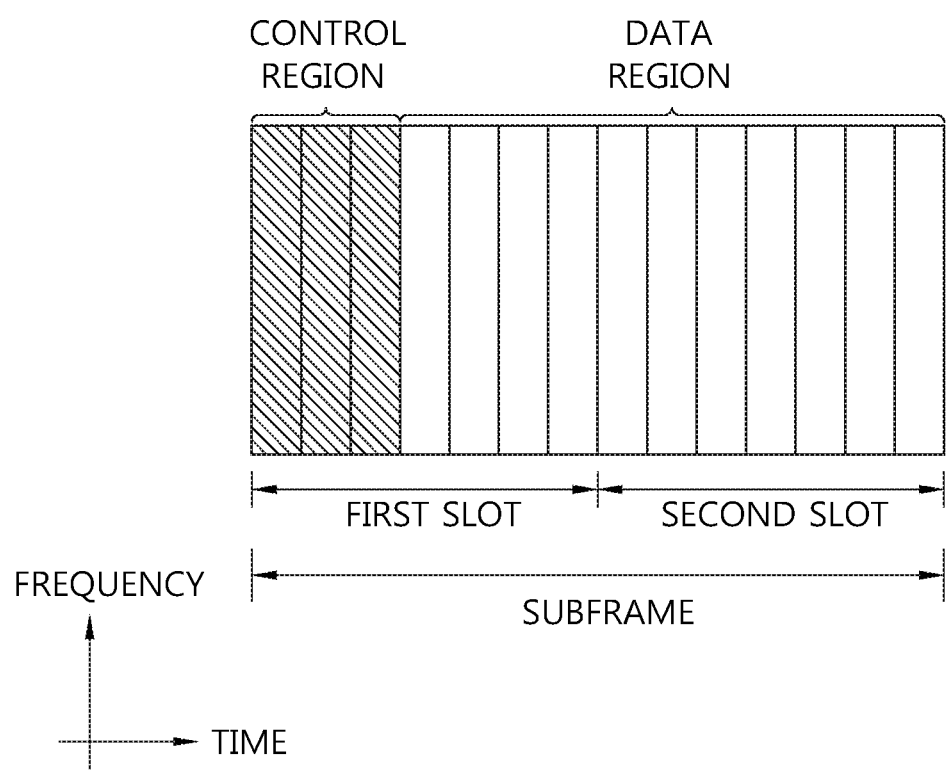
FIG. 5 illustrates the architecture of a downlink sub-frame.

FIG. 5 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
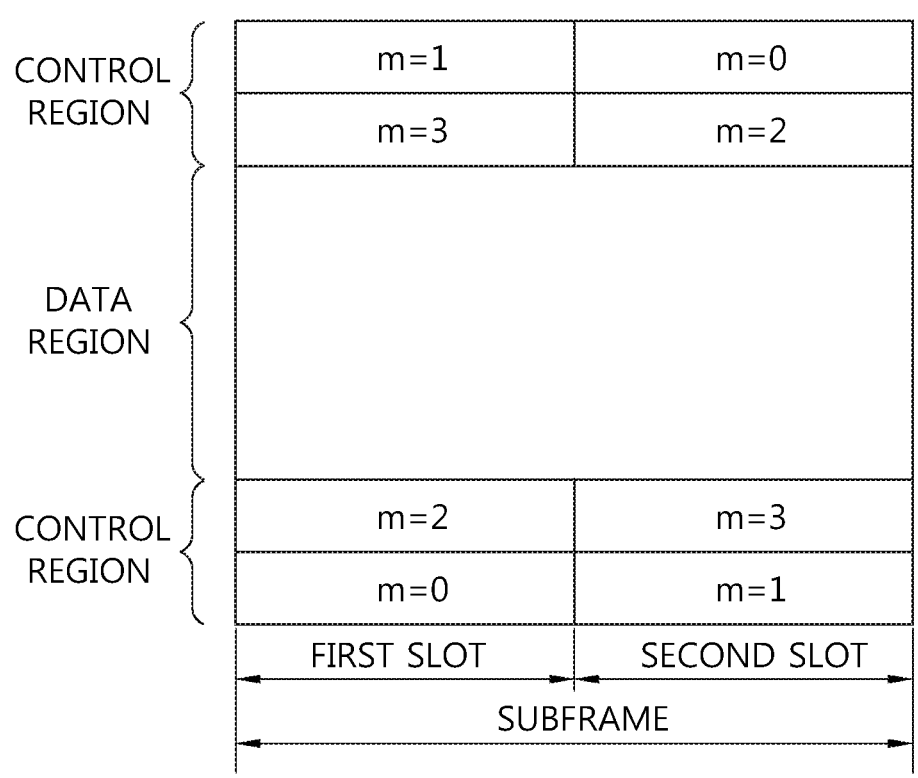
FIG. 6 illustrates the architecture of an uplink sub-frame in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Meanwhile, an SC-FDMA transmission scheme is now described.

LTE (Long-Term Evolution) adopts, for uplink, SC (Single-Carrier) FDMA that is similar to OFDM (Orthogonal Frequency Division Multiplexing).

SC-FDMA may also be referred to as DFT-s OFDM (DFT-spread OFDM). In case the SC-FDMA transmission scheme is used, a non-linear distortion section of a power amplifier may be avoided, so that transmission power efficiency may be increased in a terminal with limited power consumption. Accordingly, user throughput may be increased.

SC-FDMA is similar to OFDM in that a signal is carried over split sub-carriers using FFT (Fast Fourier Transform) and IFFT (Inverse-FFT). However, an issue with the existing OFDM transmitter lies in that signals conveyed on respective sub-carriers on frequency axis are transformed into time-axis signals by IFFT. That is, in IFFT, the same operation is operated in parallel, resulting in an increase in PAPR (Peak to Average Power Ratio). In order to prevent such PAPR increase, SC-FDMA performs IFFT after DFT spreading unlike OFDM. That is, such transmission scheme that, after DFT spreading, IFFT is conducted is referred to as SC-FDMA. Accordingly, SC-FDMA is also referred to as DFT spread OFDM (DFT-s-OFDM) in the same meaning.

As such, advantages of SC-FDMA include providing robustness over a multi-path channel that comes from the fact that it has a similar structure to OFDM while fundamentally resolving the problem of OFDM that PAPR is increased by IFFT operation, thereby enabling effective use of a power amplifier.

Meanwhile, the 3GPP is devoting its energy to standardizing LTE-Advanced that is an evolutional version of LTE, and the clustered DFT-s-OFDM scheme has been adopted which permits non-contiguous resource allocation.

The clustered DFT-s OFDM transmission scheme is a variation of the existing SC-FDMA transmission scheme, and in this scheme, data symbols that have undergone a precoder are split into a plurality of sub-blocks that are mapped, separated from each other in the frequency domain.

Meanwhile, the LTE-A system is described in further detail.

A major feature of the clustered DFT-s-OFDM scheme is to enable frequency-selective resource allocation so as to flexibly deal with a frequency selective fading environment.

At this time, in the clustered DFT-s-OFDM scheme adopted as uplink access scheme in LTE-Advanced, unlike SC-FDMA that is a conventional LTE uplink access scheme, non-contiguous resource allocation is allowed, so that uplink data transmitted may be split into several cluster units.

That is, while the LTE system is configured to maintain the single carrier characteristic in the case of uplink, the LTE-A system permits DFT_precoded data to be assigned along the frequency axis in a non-contiguous way or both a PUSCH and a PUCCH to be transmitted at the same time. In such case, it is difficult to maintain the single carrier characteristic.

A carrier aggregation system is now described.

Figure 7:
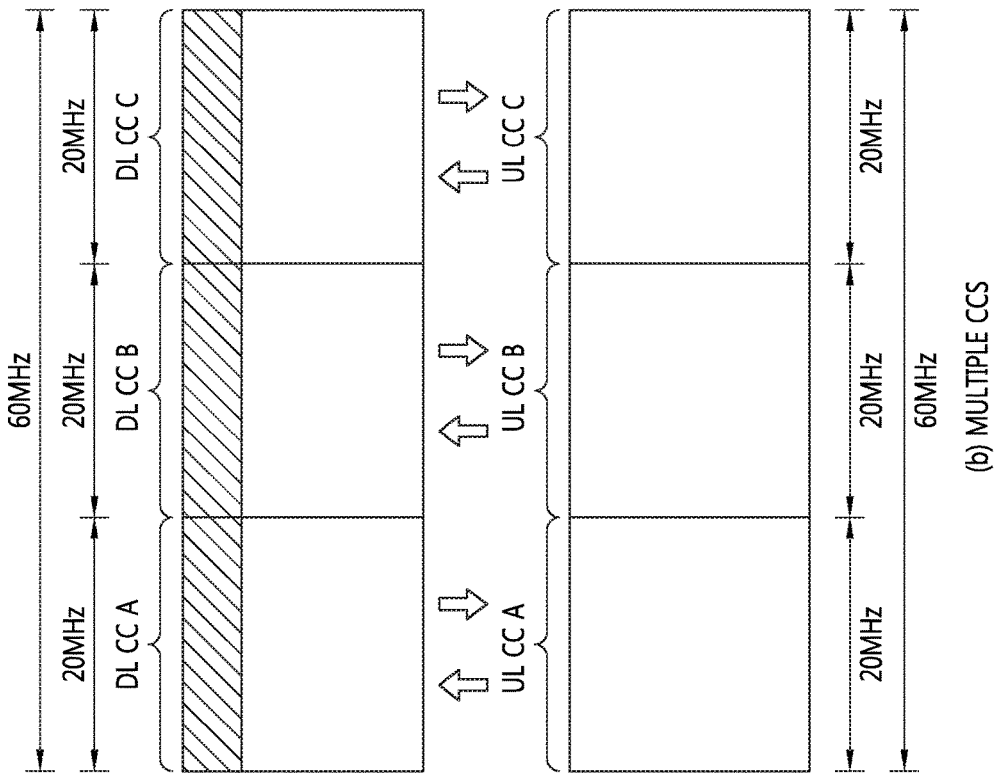
FIG. 7 illustrates an example of comparison between a single carrier system and a carrier aggregation system.
Figure 7:
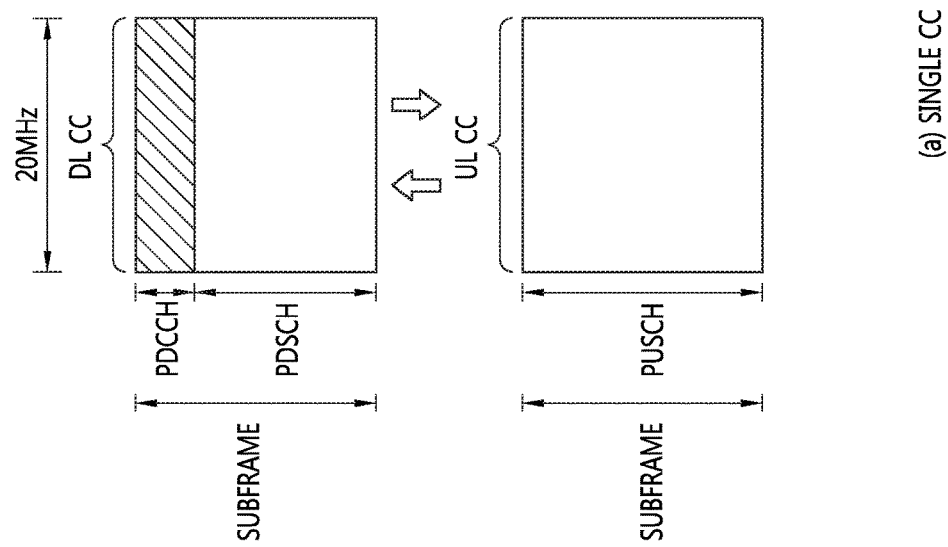

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of a uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC (carrier #0)+20 MHz CC (carrier #1)+20 MHz CC (carrier #2)+20 MHz CC (carrier #3)+5 MHz CC (carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
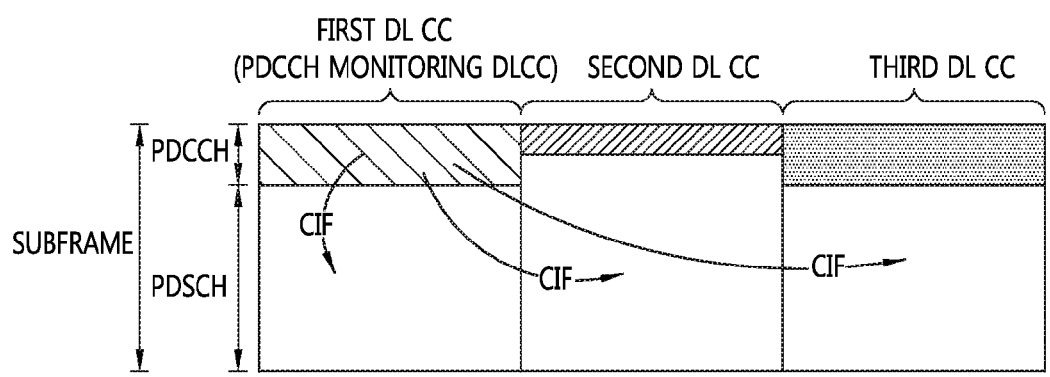
FIG. 8 illustrates an example of cross-carrier scheduling in a carrier aggregation system.

FIG. 8 illustrates an example of cross-carrier scheduling in a carrier aggregation system.

Referring to FIG. 8, the base station may configure a PDCCH monitoring DL CC (monitoring CC) set. The PDCCH monitoring DL CC set consists of some of all the aggregated DL CCs. If cross-carrier scheduling is configured, the terminal conducts PDCCH monitoring/decoding only on the DL CCs included in the PDCCH monitoring DL CC set. In other words, the base station transmits a PDCCH for PDSCH/PUSCH to be scheduled only through the DL CCs included in the PDCCH monitoring DL CC set. The PDCCH monitoring DL CC set may be configured terminal-specifically, terminal group-specifically, or cell-specifically.

In FIG. 8, three DL CCs (DL CC A, DL CC B, and DL CC C) are aggregated, and by way of example, DL CC A is set as the PDCCH monitoring DL CC set. The terminal may receive a DL grant for the PDSCH of DL CC A, DL CC B, and DL CC C through the PDCCH of DL CC A. The DCI transmitted through the PDCCH of DL CC A includes a CIF which allows it to be known which DL CC the DCI is for.

The CIF value is the same as the serving cell index value. The serving cell index is transmitted to the UE through an RRC signal. The serving cell index includes a value for identifying a serving cell, i.e., a first cell (primary cell) or a second cell (secondary cell). For example, 0 may represent a first cell (primary cell).

Figure 9:
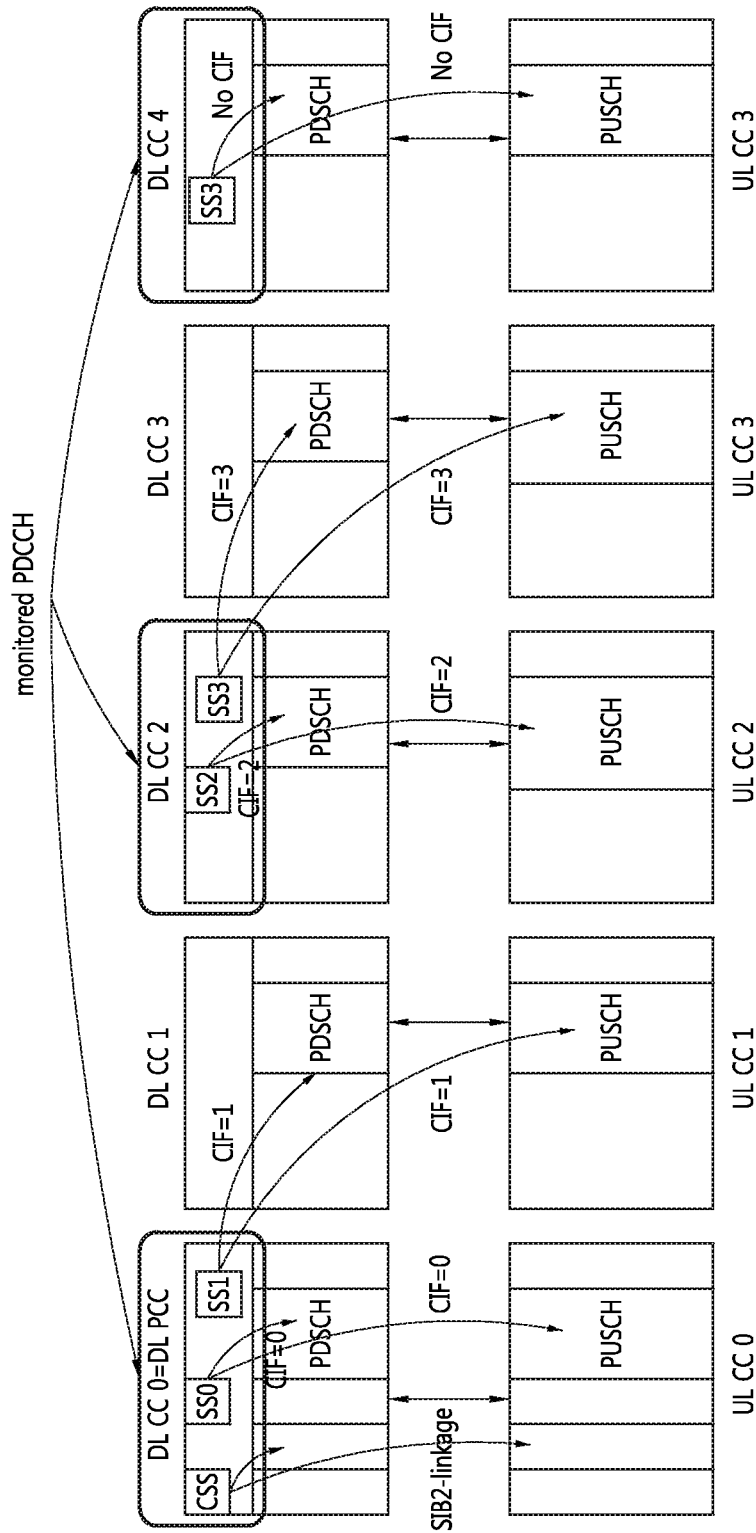
FIG. 9 illustrates an example of scheduling when cross-carrier scheduling is configured in a carrier aggregation system.

FIG. 9 illustrates example scheduling when cross-carrier scheduling is configured in a carrier aggregation system.

Referring to FIG. 9, DL CC 0, DL CC 2, and DL CC 4 are a PDCCH monitoring DL CC set. The terminal searches a DL grant/UL grant for DL CC 0, UL CC 0 (UL CC linked via SIB2 with DL CC 0) in the CSS of DL CC 0. In SS 1 of DL CC 0, a DL grant/UL grant for DL CC 1, UL CC 1 is searched. SS 1 is an example of the USS. That is, SS 1 of DL CC 0 is a search space for searching a DL grant/UL grant performing cross-carrier scheduling.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 10:
FIG. 10 is a concept view illustrating intra-band carrier aggregation (CA).
Figure 10:
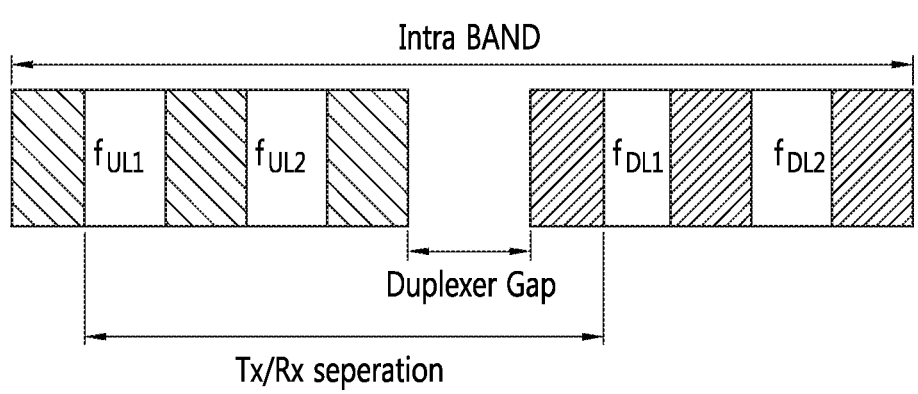

FIG. 10 is a concept view illustrating intra-band carrier aggregation (CA).

FIG. 10(a) illustrates intra-band contiguous CA, and FIG. 10(b) illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 10(a) and the intra-band non-contiguous CA shown in FIG. 10(b).

Figure 11:
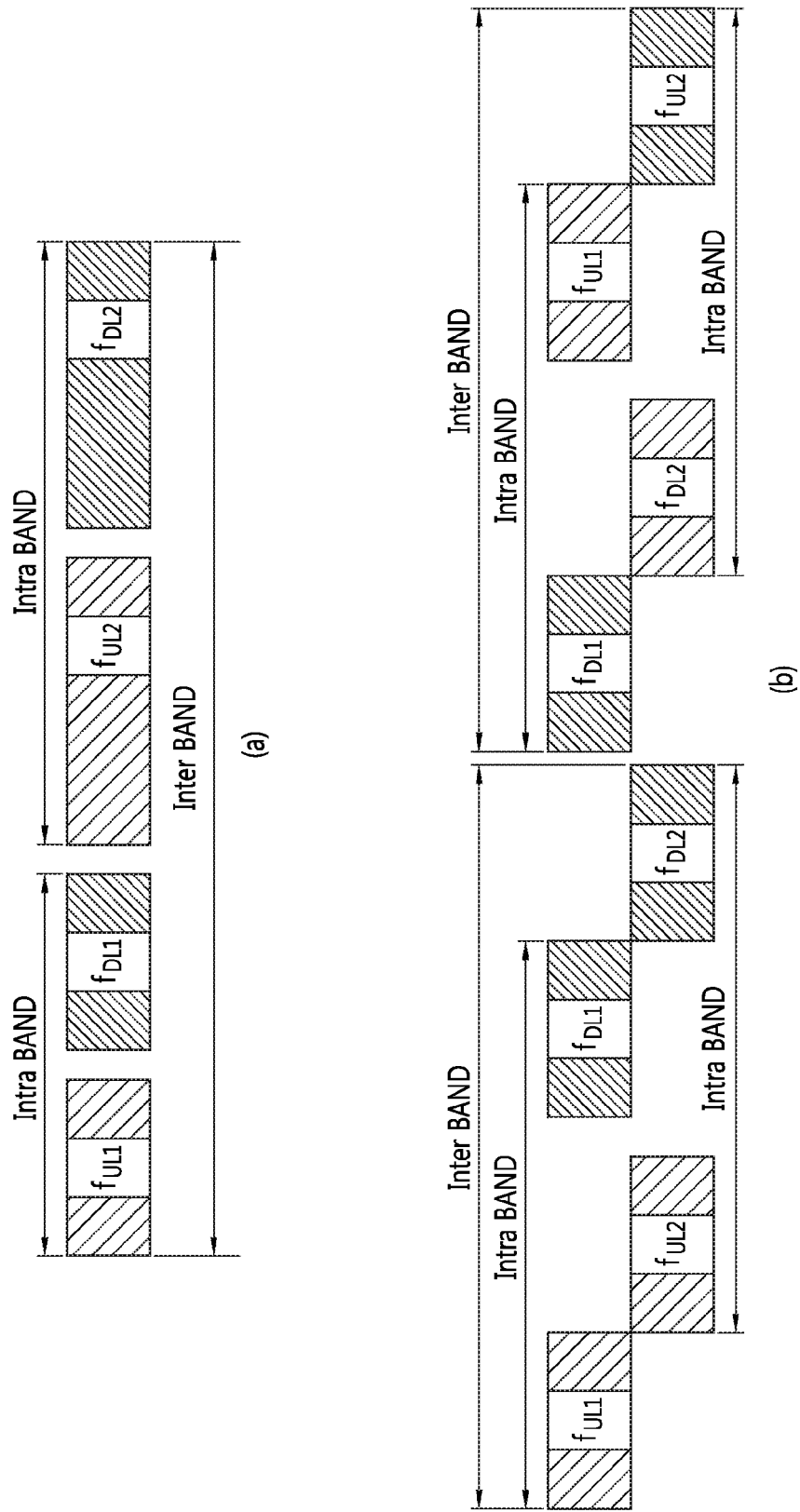
FIG. 11 is a concept view illustrating inter-band carrier aggregation.

FIG. 11 is a concept view illustrating inter-band carrier aggregation.

FIG. 11(a) illustrates a combination of a lower band and a higher band for inter-band CA, and FIG. 11(b) illustrates a combination of similar frequency bands for inter-band CA.

In other words, the inter-band carrier aggregation may be separated into inter-band CA between carriers of a low band and a high band having different RF characteristics of inter-band CA as shown in FIG. 11(a) and inter-band CA of similar frequencies that may use a common RF terminal per component carrier due to similar RF (radio frequency) characteristics as shown in FIG. 11(b).

TABLE 2

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Meanwhile, the 3GPP LTE/LTE-A systems define operating bands for uplink and downlink as shown in Table 2 above. Four CA cases shown in FIG. 11 come from Table 2.

Here, $F_{UL\_low}$ means the lowest frequency in the uplink operating bands. $F_{UL\_high}$ means the highest frequency in the uplink operating bands. Further, $F_{DL\_low}$ means the lowest frequency in the downlink operating bands, and $F_{DL\_high}$ means the highest frequency in the downlink operating bands.

When the operating bands are defined as shown in Table 2, each nation's frequency distributing organization may assign specific frequencies to service providers in compliance with the nation's circumstances.

Meanwhile, CA bandwidth classes and their corresponding guard bands are as shown in the following table.

TABLE 3

| CA Bandwidth Class | Aggregated Transmission Bandwidth Configuration | Maximum number of CCs | Nominal Guard Band BWGB |
|---|---|---|---|
| A | $N_{RB,\ agg} \leq 100$ | 1 | $0.05BW_{Channel(1)}$ |
| B | $N_{RB,\ agg} \leq 100$ | 2 | FFS |
| C | $100 < N_{RB,\ agg} \leq 200$ | 2 | $0.05\ max(BW_{Channel(1)}, BW_{Channel(2)})$ |
| D | $200 < N_{RB,\ agg} \leq [300]$ | FFS | FFS |
| E | $[300] < N_{RB,\ agg} \leq [400]$ | FFS | FFS |
| F | $[400] < N_{RB,\ agg} \leq [500]$ | FFS | FFS |

In the above table, the brackets [ ] represent that the value therebetween is not completely determined and may be varied. FFS stands for 'For Further Study.' $N_{RB\_agg}$ is the number of RBs aggregated in an aggregation channel band.

Table 4 below shows bandwidth sets respective corresponding to CA configurations.

TABLE 4

| | E-UTRA CA configuration/Bandwidth combination set | | | | | |
|---|---|---|---|---|---|---|
| E-UTRA CA configuration | 50 RB + 100 RB (10 MHz + 20 MHz) | 75 RB + 75 RB (15 MHz + 15 MHz) | 75 RB + 100 RB (15 MHz + 20 MHz) | 100 RB + 100 RB (20 MHz + 20 MHz) | Maximum aggregated bandwidth [MHz] | Bandwidth Combination Set |
| CA_1C | | Yes | | Yes | 40 | 0 |
| CA_7C | | Yes | | Yes | 40 | 0 |
| CA_38C | | Yes | | Yes | 40 | 0 |
| CA_40C | Yes | Yes | | Yes | 40 | 0 |
| CA_41C | Yes | Yes | Yes | Yes | 40 | 0 |

In the above table, CA configuration represents an operating bandwidth and CA bandwidth class. For example, CA_1C means operating band 2 in Table 2 and CA band class C in Table 3. All of the CA operating classes may apply to bands that are not shown in the above table.

Figure 12:
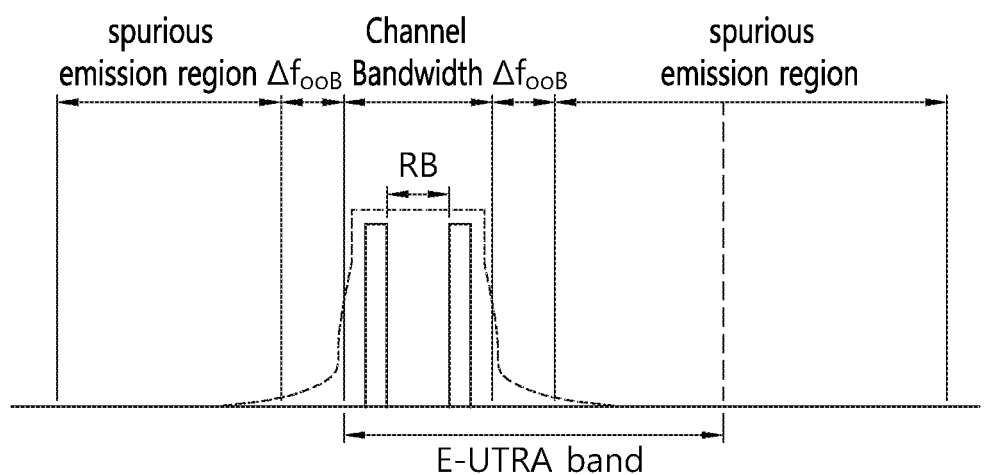
FIG. 12 illustrates the concept of unwanted emission, FIG. 13 specifically illustrates out-of-band emission of the unwanted emission shown in FIG. 12.
Figure 13:
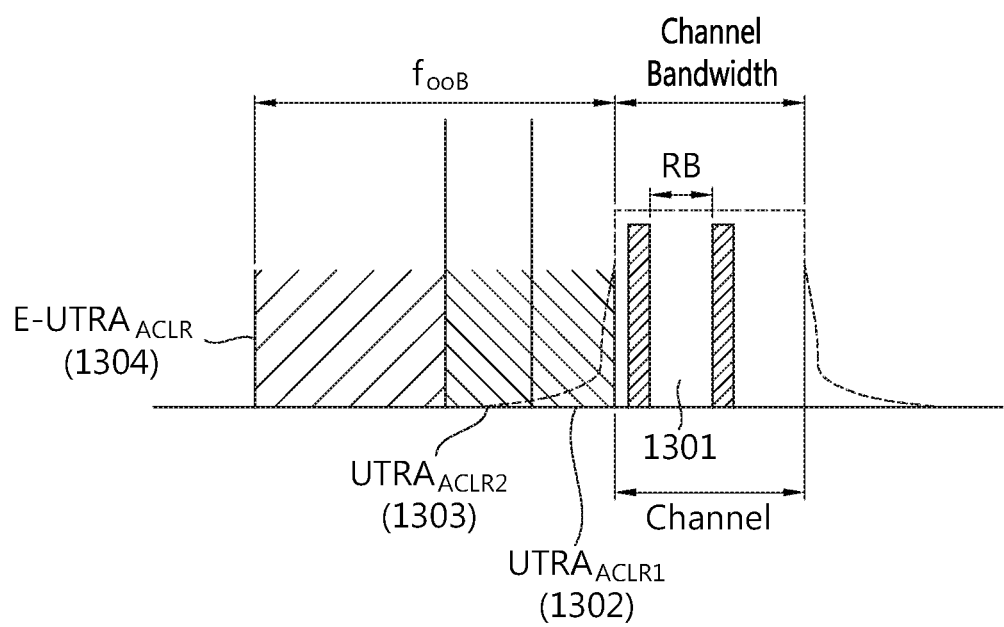
Figure 14:
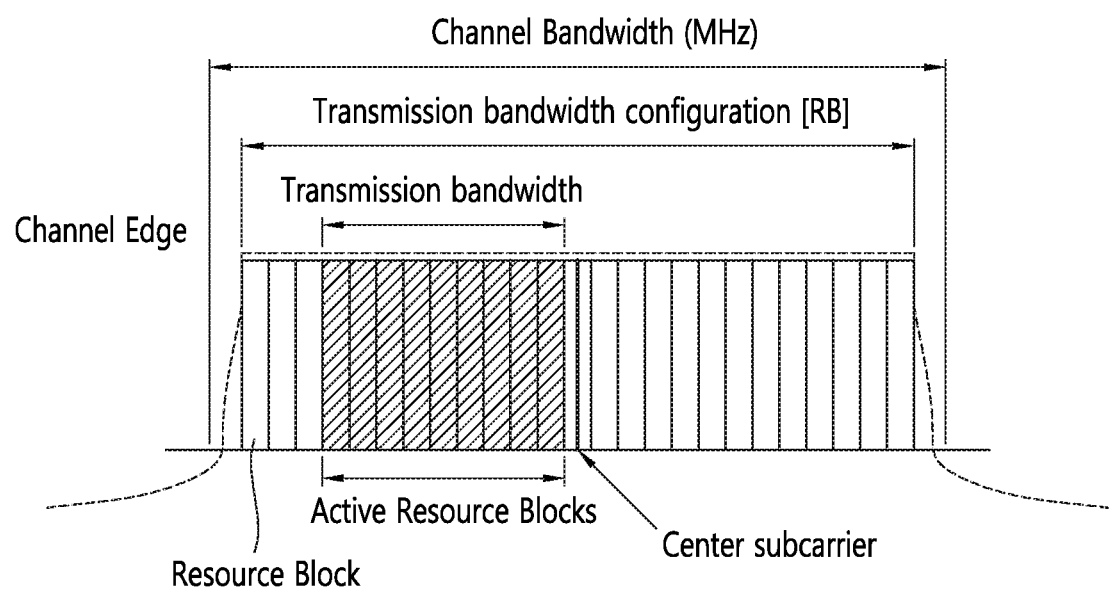
FIG. 14 illustrates a relationship between a resource block (RB) and a channel band (MHz) shown in FIG. 12.

FIG. 12 illustrates the concept of unwanted emission. FIG. 13 specifically illustrates out-of-band emission of the unwanted emission shown in FIG. 12. FIG. 14 illustrates a relationship between the resource block RB and channel band (MHz) shown in FIG. 12.

As can be seen from FIG. 12, a transmission modem sends a signal over a channel bandwidth assigned in an E-UTRA band.

Here, the channel bandwidth is defined as can be seen from FIG. 14. That is, a transmission bandwidth is set to be smaller than the channel bandwidth (BWChannel). The transmission bandwidth is set by a plurality of resource blocks (RBs). The outer edges of the channel are the highest and lowest frequencies that are separated by the channel bandwidth.

Meanwhile, as described above, the 3GPP LTE system supports channel bandwidths of 1.4 MHz, 3 MHz, 5 MHz, 10 MHz, 15 MHz, and 20 MHz. The relationship between such channel bandwidths and the number of resource blocks is as below.

TABLE 5

| | Channel bandwidth $BW_{Channel}$ [MHz] | | | | | |
|---|---|---|---|---|---|---|
| | 1.4 | 3 | 5 | 10 | 15 | 20 |
| Transmission bandwidth settings NRB | 6 | 15 | 25 | 50 | 75 | 100 |

Turning back to FIG. 12, unwanted emission arises in the band of $\Delta f_{OOB}$, and as shown, unwanted emission also occurs on the spurious area. Here, $\Delta f_{OOB}$ means the magnitude in the out-of-band (OOB). Meanwhile, the out-of-band omission refers to the one that arises in a band close to an intended transmission band. The spurious emission means that unwanted waves spread up to a frequency band that is far away from the intended transmission band.

Meanwhile, 3GPP release 10 defines basic SE (spurious emission) that should not be exceeded according to a frequency range.

In the meantime, as illustrated in FIG. 13, if transmission is conducted in the E-UTRA channel band 1301, leakage, i.e., unwanted emission, occurs to out-of-bands (1302, 1303, and 1304 in the shown $f_{OOB}$ area).

Here, $UTRA_{ACLR1}$ denotes a ratio of leakage to a channel 1302 to an E-UTRA channel 1301, i.e., an adjacent channel leakage ratio, in case the adjacent channel 1302 is the one for UTRA when a terminal conducts transmission on the E-UTRA channel 1301. $UTRA_{ACLR2}$ is a ratio of leakage to a channel 1303 (a UTRA channel) located to the adjacent channel 1302, i.e., an adjacent channel leakage ratio, in case the channel 1303 is the one for UTRA, as shown in FIG. 13. E-$UTRA_{ACLR}$ is a ratio of leakage to an adjacent channel 1304 (i.e., an E-UTRA channel) when the terminal conducts transmission through the E-UTRA channel 1301, i.e., an adjacent channel leakage ratio.

As set forth above, if transmission is conducted in an assigned channel band, unwanted emission occurs to adjacent channels.

As described above, unwanted emission arises to bands adjacent to each other. At this time, with respect to interference caused by transmission from the base station, the amount of interference to adjacent bands may be reduced to an allowed reference or less by designing a high-price and bulky RF filter in view of the base station's nature. On the contrary, in the case of the terminal, it is difficult to completely prevent interference to adjacent bands due to, e.g., the limited size of terminal and limited price of the power amplifier or pre-duplex filter RF device. Accordingly, the terminal's transmission power needs to be limited.

Hereinafter, device-to-device (D2D) communication expected to be adopted in a next-generation communication system will be described.

Figure 15A:
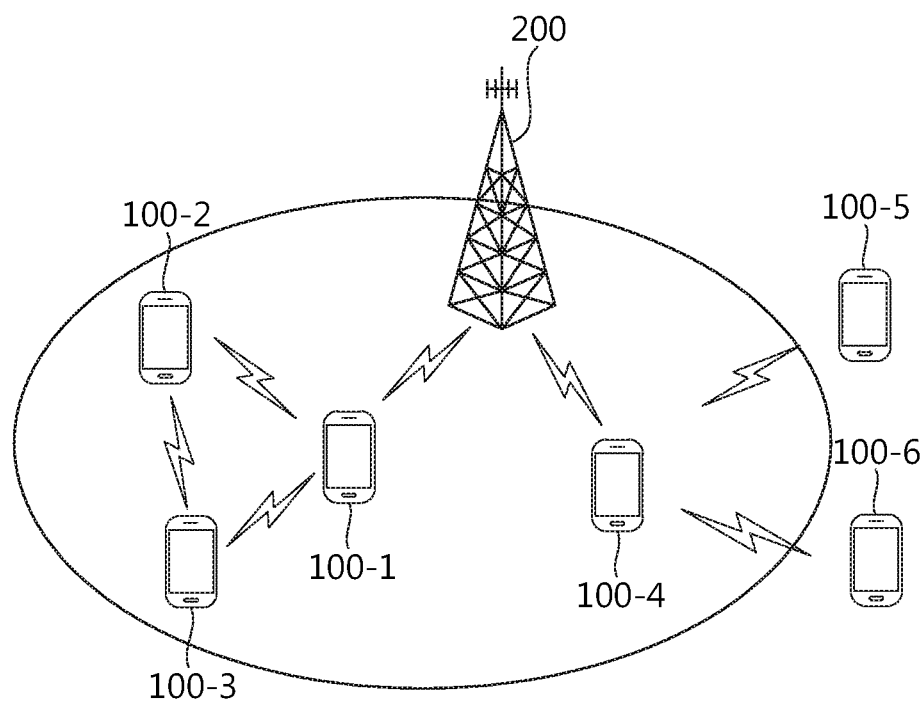
FIG. 15a illustrates the concept of D2D communication expected to be adopted in a next-generation communication system.

FIG. 15a illustrates the concept of D2D communication expected to be adopted in a next-generation communication system.

With increasing users demands for social networking services (SNSs), communication between UEs at a physically close distance, that is, D2D communication, is needed. D2D communication is performed on the basis of discovery between UEs.

To satisfy the foregoing demands, as shown in FIG. 15a, there are discussed methods for enabling direct communications among UE#1 100-1, UE#2 100-2 and UE#3(100-3) or among UE#4 100-4, UE#5 100-5 and UE#6 100-6 without intervention of a base station (eNodeB) 200. UE#1 100-1 and UE#4 100-4 can communicate with each other with a help of the eNodeB 200. Meanwhile, UE#1 100-1 may also serve as a relay for UE#2 100-2 and UE#3 100-3. Likewise, UE#4 100-4 may also serve as a relay for UE#5 100-5 and UE#6 100-6 distant from a cell center.

As described above, discussions are conducted on adoption of D2D communication between UEs for a next-generation system.

However, D2D communication between UEs may cause interference to communication with an existing system, that is, a base station, which will be described with reference to FIG. 15b.

Figure 15B:
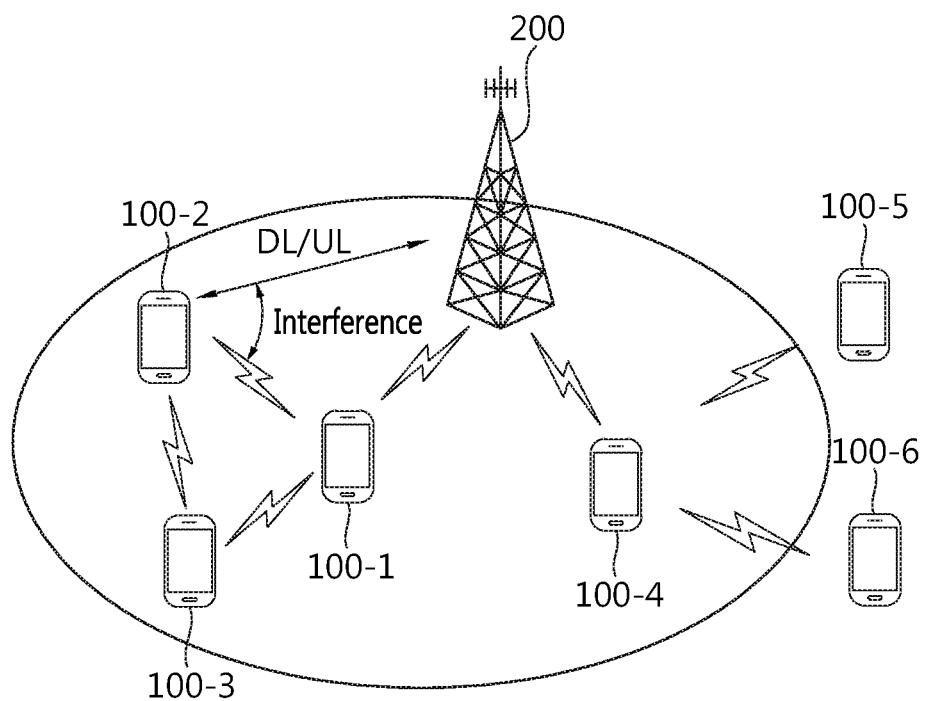
FIG. 15b illustrates an example of an interference issue between next-generation D2D communication and an existing communication system.

FIG. 15b illustrates an example of an interference issue between next-generation D2D communication and an existing communication system.

As illustrated in FIG. 15b, D2D communication between UE#2 100-2 and UE#1 100-1 may interfere with communication between UE#2 100-2 and an eNodeB 200. In particular, uplink transmission to the eNodeB 200 and downlink reception from the eNodeB 200 may cause interference to the D2D communication, and the D2D communication may cause interference to the uplink transmission to the eNodeB 200 and the downlink reception from the eNodeB 200.

Hereinafter, a) a case where a UE simultaneously performs uplink transmission to an eNodeB and D2D transmission, b) a case where a UE simultaneously performs uplink transmission to an eNodeB and D2D reception, c) a case where a UE simultaneously performs downlink reception from an eNodeB and D2D transmission, and d) a case where a UE simultaneously performs downlink reception from an eNodeB and D2D reception are considered to seek solutions to an interference issue in these cases.

Although an LTE/LTE-A system is illustrated as an existing communication system in the present invention, the description of the present present may also be applied to other existing systems. Meanwhile, it is assumed that the same frequency as actually used in LTE/LET-A is used for D2D communication.

Figure 16A:
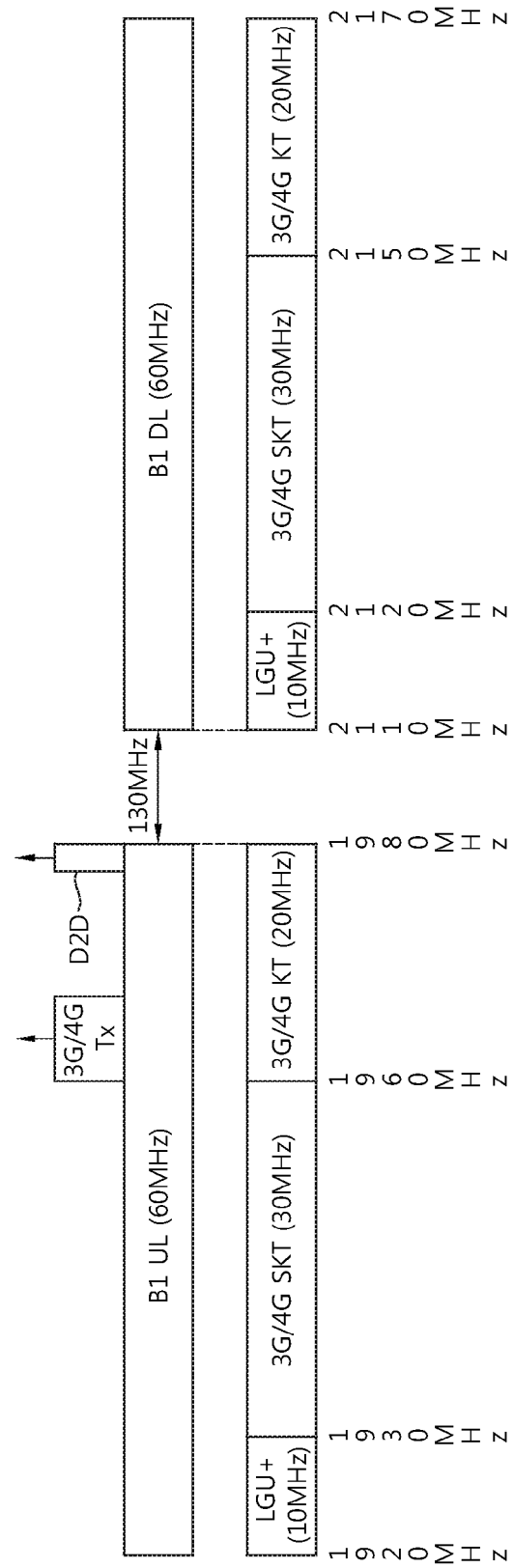
FIG. 16a illustrates a case where a UE simultaneously performs uplink transmission to an eNodeB and D2D transmission.

FIG. 16a illustrates a case where a UE simultaneously performs uplink transmission to an eNodeB and D2D transmission.

FIG. 16a illustrates frequency bands operated by mobile telecommunications service providers in South Korea within E-UTRA Band 1 illustrated in Table 2. As illustrated in Table 2, in E-UTRA Band 1, an uplink band is from 1920 MHz to 1980 MHz, and a downlink band is from 2110 MHz to 2170 MHz. LGU+ uses 1920 MHz to 1930 MHz for an uplink, and 2110 MHz to 2120 MHz for a downlink. SK Telecom uses 1930 MHz to 1960 MHz for an uplink, and 2120 MHz to 2150 MHz for a downlink. KT uses 1960 MHz to 1980 MHz for an uplink, and 2150 MHz to 2170 MHz for a downlink.

Consider a case where a UE subscribing to KT performs uplink transmission to an eNodeB simultaneously with D2D transmission. Here, an RB region for performing transmission to the eNodeB and counter intermodulation distortion (CIM3) by DC need not to overlap with a region for D2D transmission in order to prevent distortion of a D2D signal by CIM3.

Thus, according to a method of one embodiment, when D2D transmission is performed in the same band as uplink transmission to a base station, an RB region for performing uplink transmission to the base station is spaced apart from an RB for performing D2D transmission, which will be described in detail with reference to FIG. 16b.

Figure 16B:
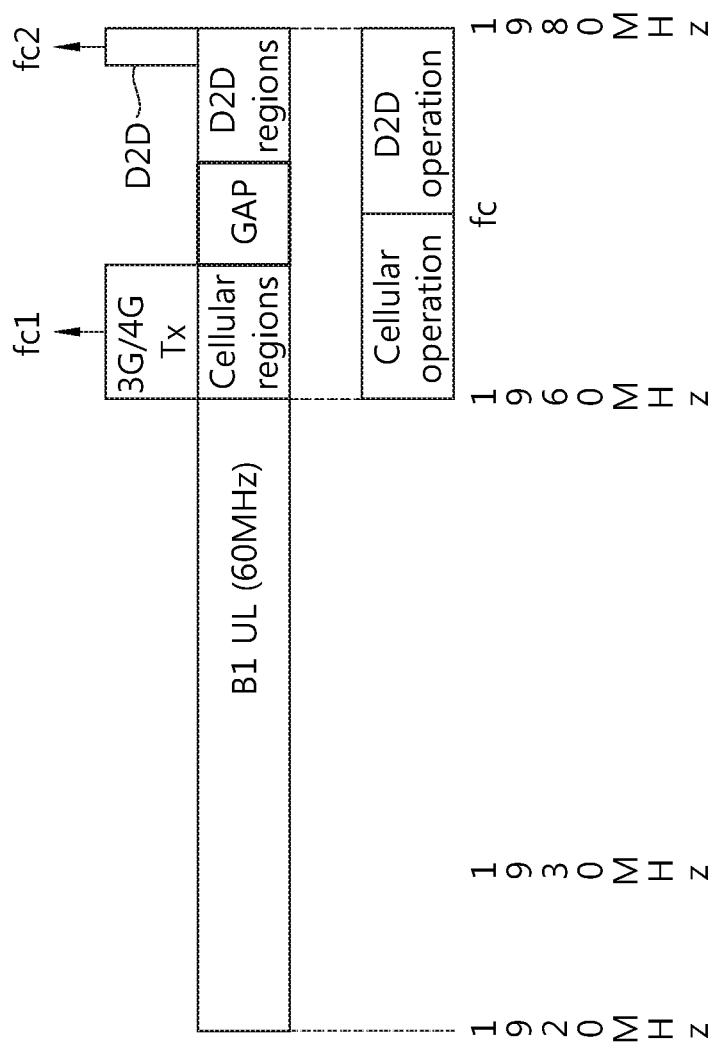

FIG. 16b illustrates an example of a solution for the case illustrated in FIG. 16a.

According to the solution of the embodiment, as illustrated in FIG. 16b, when a UE subscribing to KT desires to perform uplink transmission to an eNodeB simultaneously with D2D transmission in an uplink band of E-UTRA Band 1 illustrated in Table 2, the UE performs uplink transmission to the eNodeB in a lower frequency range than a gap and performs D2D transmission in a higher frequency range than the gap. The gap serves as a guard band and separates an RB region for performing uplink transmission to the eNodeB from an RB region for performing D2D transmission as far apart as possible.

Meanwhile, when the UE performs uplink transmission to a base station and D2D transmission in the same band as above, the amount of unwanted emission arising in the same band may be greater than that in single transmission and unwanted emission similar to that in existing intra-band non-contiguous CA may occur. However, a difference in power between D2D transmission and transmission to an existing LTE/LTE-A base station may be even greater than expected in previous specifications and thus may not satisfy requirements of the existing 3GPP. Here, to simultaneously achieve uplink transmission to a base station and D2D transmission, a change to the 3GPP requirements is needed. This change can be achieved simply as follows. For example, since unwanted emission in the above situation has a similar emission level to that in intra-band non-contiguous CA, requirements for intra-band non-contiguous CA are modified to be applicable to the above situation.

However, when an actual emission level is exceptionally too high or in a class of high maximum terminal transmission power, D2D transmission and uplink transmission to a base station may be performed by time division in TDM. For example, when a PDCCH including an UL grant is received in an nth subframe, PUCCH transmission to an eNodeB may be performed in an (n+4)th subframe and D2D transmission may be performed in an (n+5)th subframe or following subframes.

Figure 17:
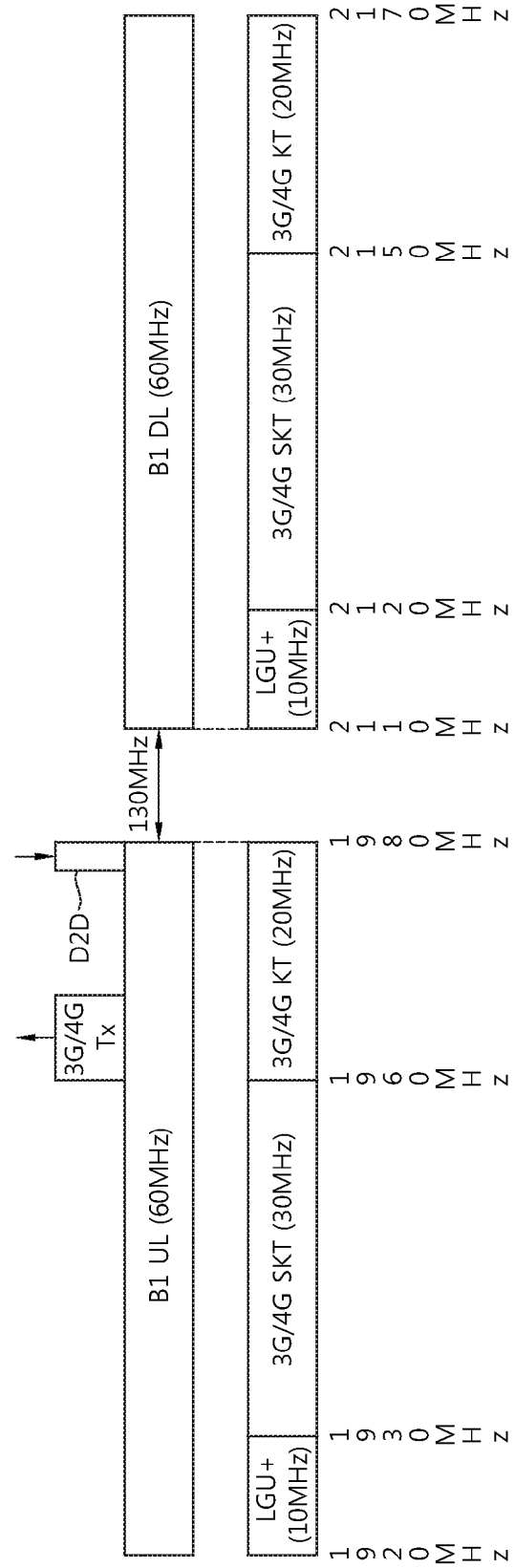
FIG. 17 illustrates a case where a UE simultaneously performs uplink transmission to an eNodeB and D2D reception.

FIG. 17 illustrates a case where a UE simultaneously performs uplink transmission to an eNodeB and D2D reception.

FIG. 17 illustrates a case where a UE subscribing to KT desires to perform uplink transmission to an eNodeB simultaneously with D2D reception in an uplink band of E-UTRA Band 1 illustrated in Table 2.

In this case, uplink transmission to the eNodeB by the UE may distort a D2D signal received by the UE. Thus, to minimize this distortion, one embodiment suggests a method of spacing an RB region in an uplink band for the UE to perform uplink transmission to the eNodeB apart from an RB region for D2D reception.

However, despite the spaced RB regions, since transmission and reception occur simultaneously in the same uplink band, a problem that self-interference by an analog filter cannot be reduced still remains. Thus, an additional filter is needed for a transceiver of the UE. In this case, an RB region for communication with the eNodeB, that is, cellular communication, and an RB region for D2D communication need to be spaced apart from each other at a certain distance depending on a channel bandwidth supported by the UE in order to protect a D2D reception signal. That is, a guard band is disposed between the RB region for cellular communication and the RB region for D2D communication, a self-interference signal introduced in the guard band is removed using the filter, and a D2D signal is received, thereby receiving a D2D signal with higher reliability.

Hereinafter, a detailed description will be made with reference to FIGS. 18a to 18d.

Figure 18A:
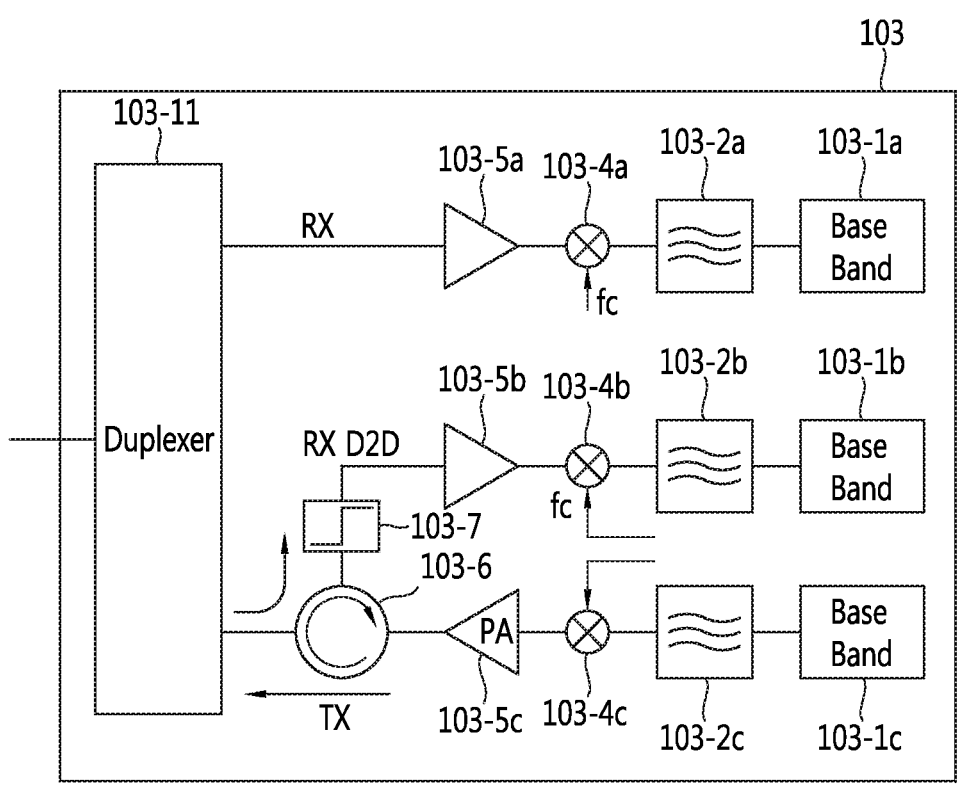
FIGS. 18a, 18b, 18c and 18d illustrate examples of transceivers of a UE for resolving a self-interference issue.
Figure 18B:
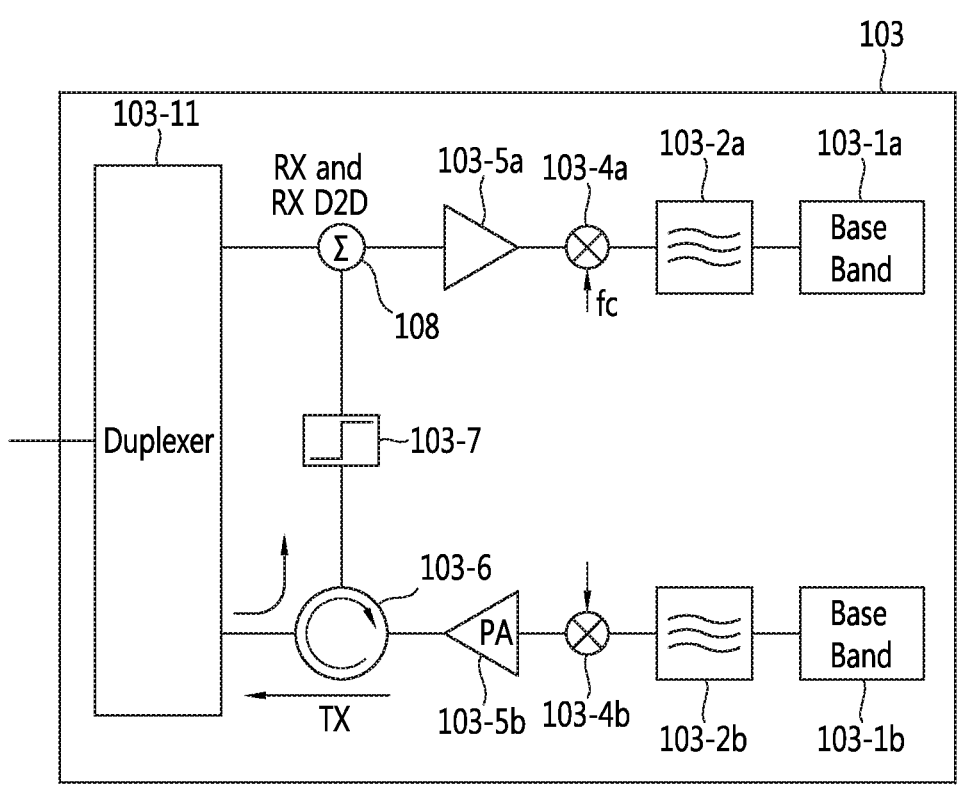

FIGS. 18a and 18b illustrate examples of transceivers of a UE for resolving a self-interference issue.

First, FIG. 18a illustrates a structure of a transceiver of a UE according to a first embodiment. The structure of the transceiver according to the first embodiment includes a first RF chain to process a cellular reception signal, a second RF chain to process a D2D reception signal, and a third RF chain to process a transmission signal.

The first RF chain to process the cellular reception signal includes a first baseband unit 103-1a for cellular reception, a first filter 103-2a, a first composition unit 130-4a to remove a first carrier fc1 to output an intermediate frequency, and a first low-noise amplifier (LNA) 103-5a. The second RF chain to process the D2D reception signal includes a second baseband unit 103-1b to convert a cellular reception signal into a baseband signal, a second filter 103-2b, a second composition unit 130-4b to remove a second carrier fc2 to output an intermediate frequency, and a second LNA 103-5b. The third RF chain to process the transmission signal includes a third baseband unit 103-1c for transmission, a third filter 103-2c, a third composition unit 130-4c to compose a carrier, and a power amplifier (PA) 103-5c.

The first RF chain and the third RF chain are connected to a duplexer 103-11. The duplexer 103-11 serves to distribute a cellular transmission/reception signal to any one of the first RF chain and the third RF chain. The duplexer 103-11 outputs a transmission signal transmitted from the third RF chain to an antenna (not shown). A directional coupler 103-6 is connected between the PA 103-6 of the third RF chain and the duplexer 103-11. The directional coupler 103-6 separates transmission Tx and D2D reception Rx. That is, a D2D signal received at a transmission frequency is transmitted by the directional coupler to a D2D reception unit, without causing effect on a cellular transmission unit.

Here, as shown in FIG. 18a, a self-interference removing filter 103-7 is connected between the directional coupler 103-6 of the third RF chain and the second LNA 103-5b of the second RF chain.

In describing operations with this structure, the directional coupler 103-6 transmits a signal output from the PA 103-5c of the third RF chain to the duplexer 103-11 and transmits a D2D input signal received from the duplexer 103-11 to the self-interference removing filter 103-7. The self-interference removing filter 103-7 performs filtering so that the signal output from the PA 103-5c of the third RF chain does not leak into the second RF chain not to cause self-interference.

Alternatively, FIG. 18b illustrates a structure of a transceiver of a UE according to a second embodiment. Unlike the structure illustrated in FIG. 18a, the structure of the transceiver according to the second embodiment illustrated in FIG. 18b includes only a first RF chain to process a cellular reception signal and a D2D reception signal and a second RF chain to process a transmission signal.

A self-interference removing filter 103-7 and an accumulator 108 are connected between a directional coupler 103-6 connected to a PA 103-5b of the second RF chain and an LNA 103-5a of the first RF chain.

In describing operations with this structure, the directional coupler 103-6 transmits a signal output from the PA 103-5b of the second RF chain to a duplexer 103-11 and transmits a D2D input signal received from the duplexer 103-11 to the self-interference removing filter 103-7. The self-interference removing filter 103-7 performs filtering so that the signal output from the PA 103-5b of the second RF chain does not leak into the first RF chain not to cause self-interference. The accumulator 108 accumulates the signal output from the self-interference removing filter 103-7 and the signal output from the duplexer 103-11 and outputs the accumulated signal to an LNA 103-5a of the first RF chain.

Figure 18C:
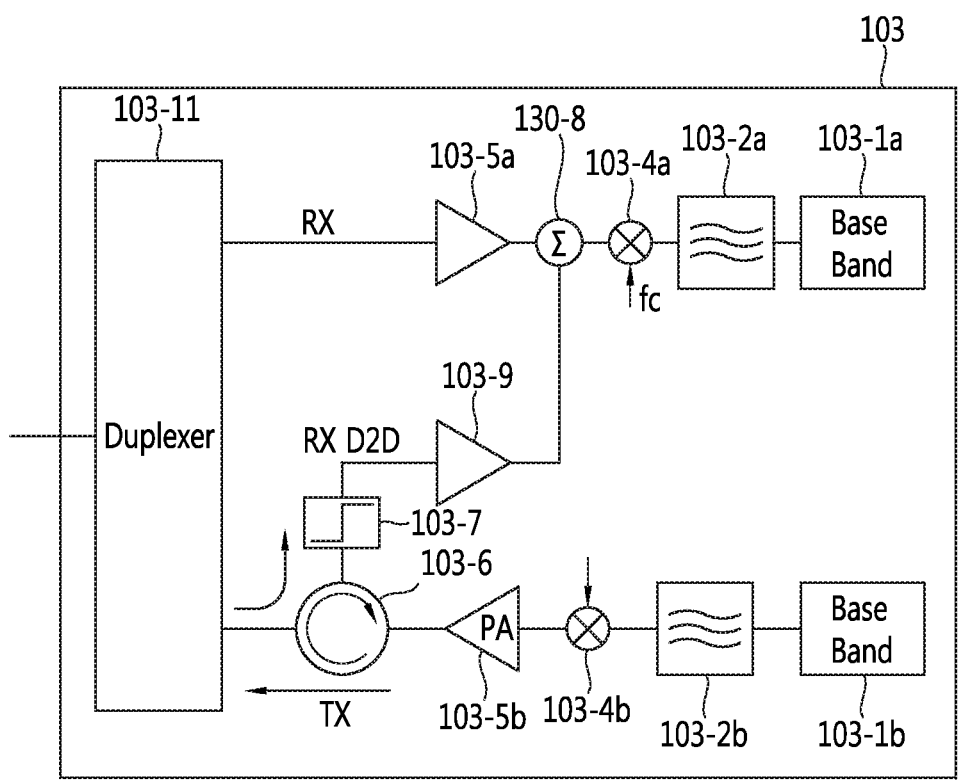

Alternatively, FIG. 18c illustrates a structure of a transceiver of a UE according to a third embodiment. As in FIG. 18b, the structure of the transceiver according to the third embodiment illustrated in FIG. 18c includes only a first RF chain for reception and a second RF chain for transmission. A significant difference between this structure and FIG. 18b is a second LNA 103-9 for D2D that is further added to compensate for LNA linearity which may be broken when a difference in power between a cellular signal and a D2D signal is great or when an UL frequency and a DL frequency are substantially distant from each other.

An accumulator 103-8 is connected between a first LNA 103-5a and a first composition unit 103-4a of the first RF chain. A self-interference removing filter 103-7 and the LNA 103-9 are connected between a directional coupler 103-6 connected to a PA 103-5b of the second RF chain and the accumulator 103-8 of the first RF chain.

In describing operations with this structure, the directional coupler 103-6 transmits a signal output from the PA 103-5b of the second RF chain to the duplexer 103-11 and transmits a D2D input signal received from the duplexer 103-11 to the self-interference removing filter 103-7. The self-interference removing filter 103-7 performs filtering so that the signal output from the PA 103-5b of the second RF chain does not leak into the first RF chain not to cause self-interference. The signal output from the self-interference removing filter 103-7 is amplified via the second LNA 103-9 and input to the accumulator 108. The accumulator 108 accumulates the signal output from the second LNA 103-9 connected to the self-interference removing filter 103-7 and the signal output from the first LNA 103-5a connected to the duplexer 103-11 and outputs the accumulated signal to the first composition unit 103-4a of the first RF chain.

Figure 18D:
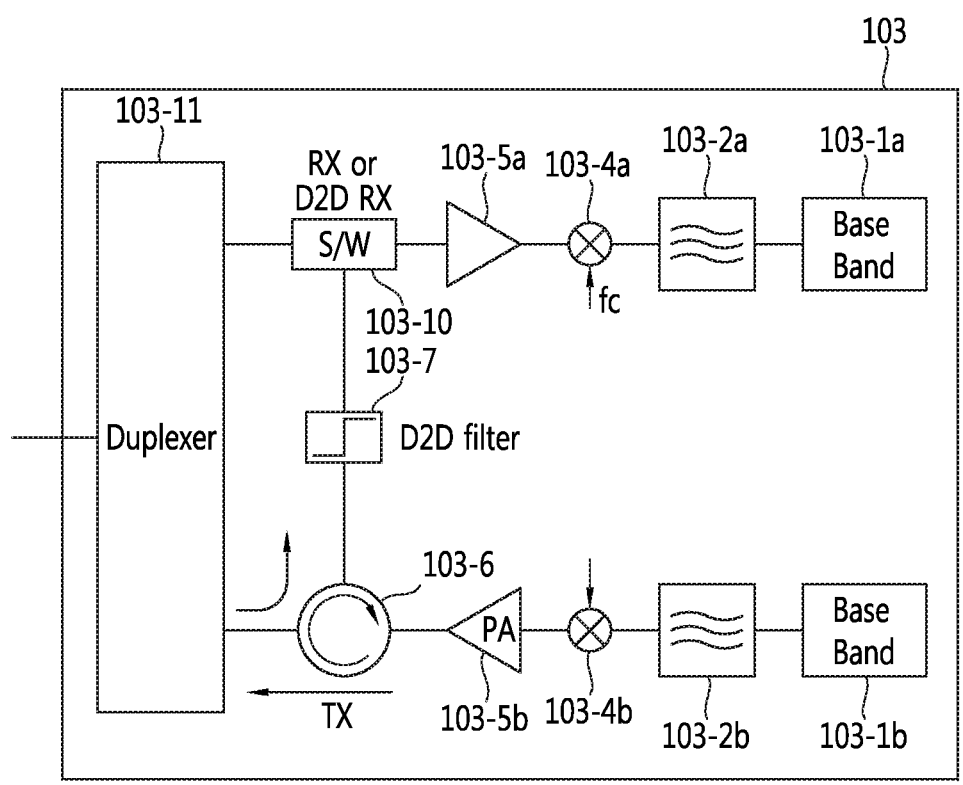

Alternatively, FIG. 18d illustrates a structure of a transceiver of a UE according to a fourth embodiment. As in FIGS. 18b and 18c, the structure of the transceiver according to the fourth embodiment illustrated in FIG. 18d includes only a first RF chain for reception and a second RF chain for transmission.

A switch 103-10 is connected between a duplexer 103-11 and a first LNA 103-5*a* of the first RF chain. A directional coupler 103-6 is connected between the duplexer 103-11 and a PA 103-5*b* of the second RF. A self-interference removing filter 103-7 is connected between the directional coupler 103-6 and the switch 103-10.

In describing operations with this structure, the directional coupler 103-6 transmits a signal output from the PA 103-5*b* of the second RF chain to a duplexer 103-11 and transmits a D2D input signal received from the duplexer 103-11 to the self-interference removing filter 103-7. The self-interference removing filter 103-7 performs filtering so that the signal output from the PA 103-5*b* of the second RF chain does not leak into the first RF chain not to cause self-interference. The signal output from the self-interference removing filter 103-7 is output to the switch 103-10. The switch 103-10 alternately outputs the signal output from the duplexer 103-11 and the signal output from the self-interference removing filter 103-7 to the first LNA 103-5*a*.

The structures of the transceivers of the UE according to the first to fourth embodiments have advantages and disadvantages as follows. First, the transceiver structure of the UE according to the first embodiment illustrated in FIG. 18*a* includes the second RF chain for D2D reception, separate from the first RF chain for cellular reception and the third chain for transmission. This structure has an advantage of simultaneously performing cellular communication and D2D communication without restriction but has a disadvantage of increased complexity due to addition of the D2D RF chain. The transceiver structure of the UE according to the second embodiment illustrated in FIG. 18*b* enables cellular communication and D2D communication to simultaneously performed with a comparatively simple structure but has a disadvantage of breaking signal linearity by the LNA 103-5*a* when a power difference between a D2D signal and a cellular signal is great. A structure for overcoming this problem is the structure illustrated in FIG. 18*c* in which the second LNA 103-9 for a D2D reception signal is added. This transceiver structure of the UE is capable of simultaneously performing cellular communication and D2D communication and maintaining linearity between two signals. However, this structure needs to use an RF chain capable of covering a broad band in order to simultaneously process reception signals, having relatively excellent performance as compared with other structures and not causing a substantial rise in UE price. Finally, the transceiver structure of the UE according to the fourth embodiment illustrated in FIG. 18*d* has very low complexity but is capable of performing cellular communication and D2D communication by TDM, not simultaneously. Considering these advantages and disadvantages, the transceiver structure of the UE according to the third embodiment illustrated in FIG. 18*c* is a comparatively more suitable transceiver structure for a UE. However, considering D2D communication, when signals are intermittently transmitted, the structure of FIG. 18*d* is also excellent in view of performance and UE price.

Figure 19A:
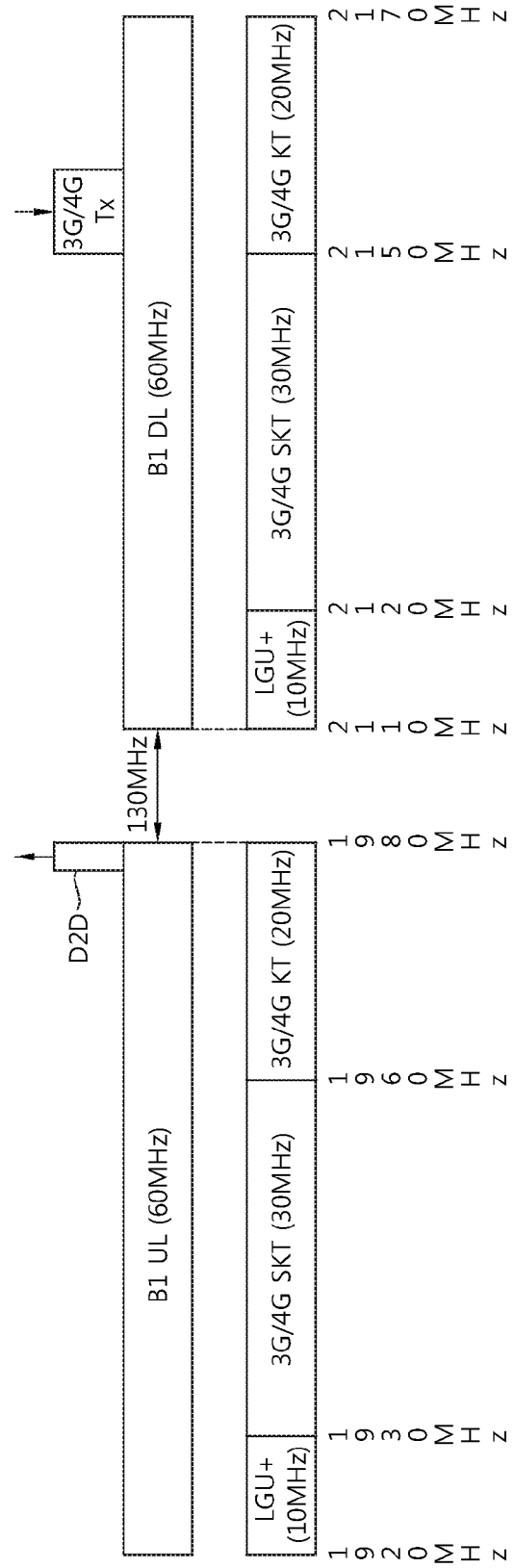
FIG. 19a illustrates a case where a UE simultaneously performs downlink transmission from an eNodeB and D2D transmission.

FIG. 19*a* illustrates a case where a UE simultaneously performs downlink transmission from an eNodeB and D2D transmission.

FIG. 19*a* illustrates a case where a UE subscribing to KT desires to perform downlink reception from an eNodeB in a downlink band of E-UTRA Band 1 illustrated in Table 2 simultaneously with D2D transmission in an uplink band of E-UTRA Band 1.

In this case, since the uplink band for the UE to perform D2D transmission is substantially distant from the downlink band for the UE to perform downlink reception from the eNodeB, D2D transmission and downlink reception can be performed smoothly. Further, since D2D transmission is generally performed with another adjacent UE, power used for D2D transmission is smaller than power used for general cellular communication, and thus D2D transmission and downlink reception can be performed smoothly.

Here, in existing LTE/LTE-A systems, a receiver reference sensitivity (REFSENS) requirement is set up depending on how much effect a leakage by D2D transmission of a UE causes to a downlink. Thus, it is necessary to examine whether the REFSENS requirement is applicable to D2D transmission as it is, which is described below with reference to FIG. 19*b*.

Figure 19B:
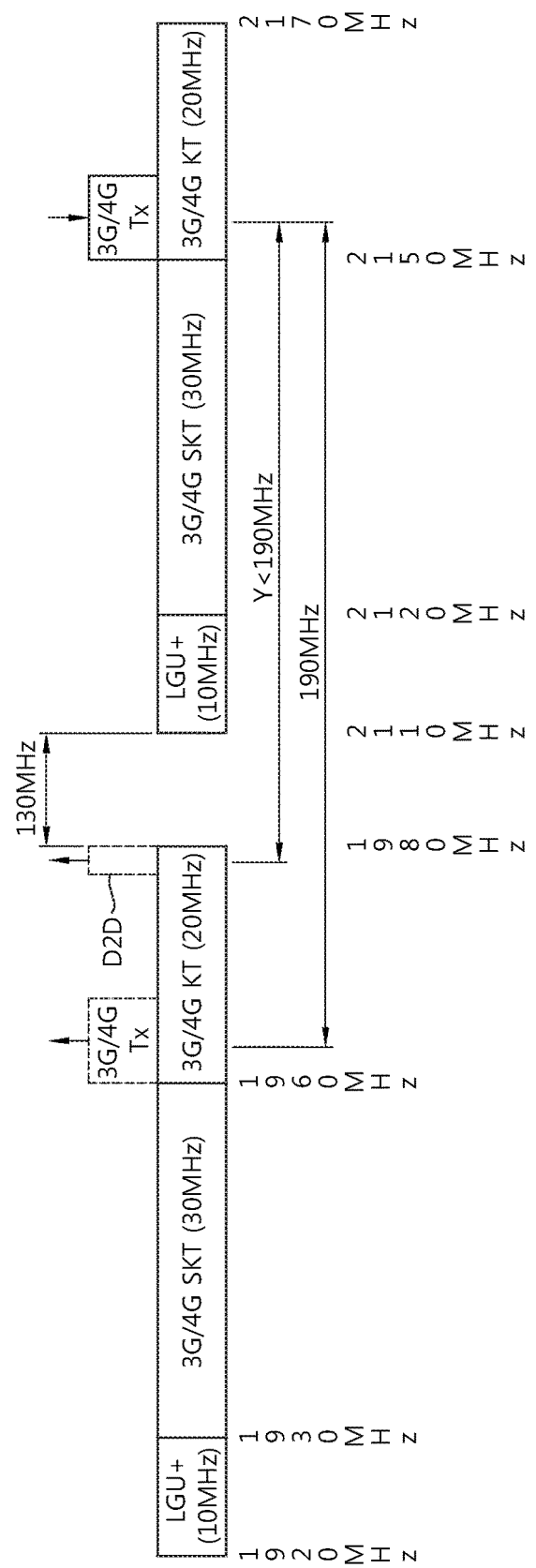
FIG. 19b illustrates an example of describing a reference sensitivity (REFSENS) requirement in a case where a UE simultaneously performs downlink transmission from an eNodeB and D2D transmission.

FIG. 19*b* illustrates an example of describing a reference sensitivity (REFSENS) requirement in a case where a UE simultaneously performs downlink transmission from an eNodeB and D2D transmission.

In existing LTE/LTE-A systems, there is a required separation distance Y between transmission Tx and reception Rx. As shown in FIG. 19*b*, a distance between an RB region for performing D2D transmission and an RB region for downlink reception from the eNodeB may be shorter than Y. Thus, an existing reference sensitivity (REFSENS) requirement cannot be guaranteed. Accordingly, a leakage by D2D transmission may cause interference to the downlink in a particular band and desense of reference sensitivity (REFSENS) occurs by the extent of this interference, and accordingly the existing reference sensitivity (REFSENS) requirement needs to be relieved, which is described in detail as follows.

Among E-UTRA bands illustrated in Table 2, desense of reference sensitivity (REFSENS) is likely to occur in a band in a case of Y/X<=gamma (for example, gamma=4) when a pass band is X MHz and a separation between transmission Tx and reception Rx is Y MHz. When gamma is 4 or greater, there is capacity for desense of reference sensitivity (REFSENS) to a certain degree, and thus reception performance can be guaranteed even when D2D transmission and cellular reception are simultaneously performed. However, when gamma is smaller than 4, the separation between transmission Tx and reception Rx also decreases, and accordingly D2D transmission may cause desense of REFSENS in cellular reception, not guaranteeing the existing receiver sensitivity REFSENS requirement. Thus, according to the present invention, in this case, a signal is transmitted to the UE in this particular operating band so that D2D transmission (Tx) and cellular reception Rx may not be performed simultaneously. To simultaneously perform D2D transmission and cellular reception, maximum output power for a D2D transmission signal can be limited, and an RB region for performing D2D transmission can be limited (for example, an RB region for D2D transmission can be separated from an RB region for cellular reception as far apart as possible).

Figure 20:
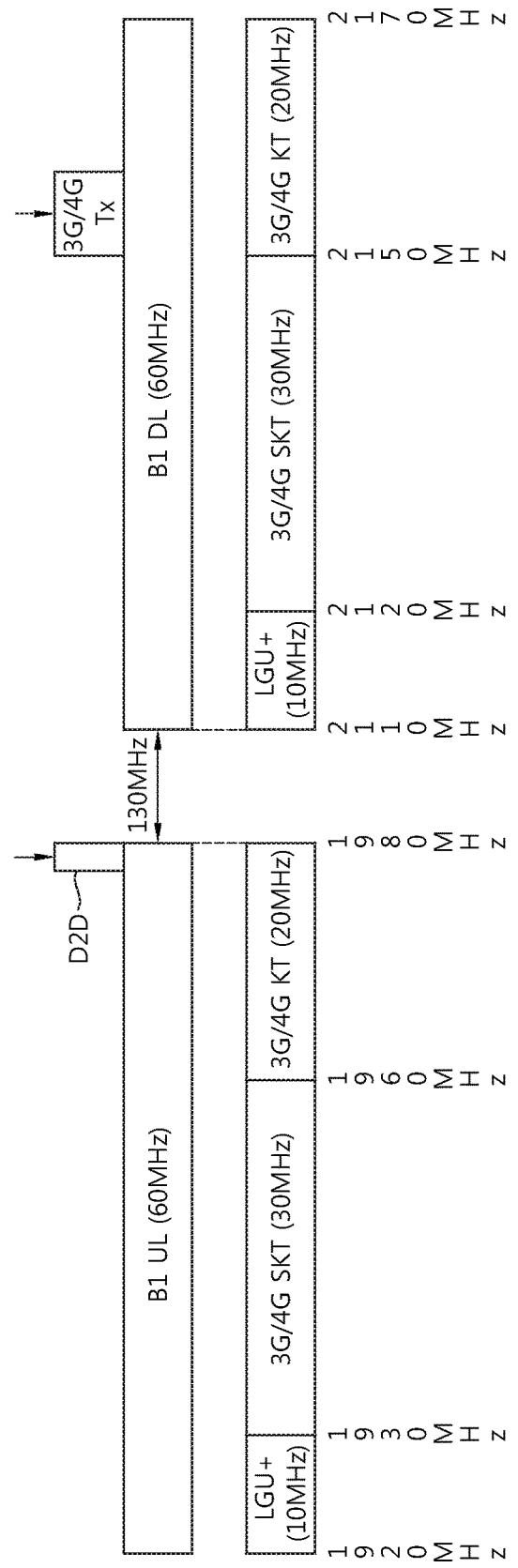
FIG. 20 illustrates a case where a UE simultaneously performs downlink reception from an eNodeB and D2D reception.

FIG. 20 illustrates a case where a UE simultaneously performs downlink reception from an eNodeB and D2D reception.

FIG. 20 illustrates a case where a UE subscribing to KT desires to perform downlink reception from an eNodeB in a downlink band of E-UTRA Band 1 illustrated in Table 2 simultaneously with D2D reception in an uplink band of E-UTRA Band 1.

To realize the above case, as illustrated above in FIG. 18*a*, a separate RF chain for D2D is needed, which may cause a complex transceiver structure and an increase in unit cost. In particular, according to 3GPP LTE-A Rel-11, a UE is required to support CA and feICIC and thus already has fully increased complexity, in which addition of the RF chain for D2D further aggravates complexity.

Thus, the UE transceivers having no separate RF chain for D2D illustrated in FIGS. 18b to 18d may be preferable in view of a limited size of a UE. Among these, the UE transceiver structure illustrated in FIG. 18c is an efficient structure for a channel bandwidth too wide to guarantee linearity of the first LNA 103-5a in the RF chain for reception, thus including the second LNA 203-9. The transceiver structure illustrated in FIG. 18d is very simple and can be realized with low cost, whereas this structure divides D2D communication from cellular communication using TDM and thus cannot perform D2D communication and cellular communication simultaneously. Consequently, the UE transceiver structure illustrated in FIG. 18b is simple and capable of simultaneously performing cellular communication and D2D communication and thus may be the most suitable.

Embodiment of the present invention may be implemented through various means. For example, the embodiments of the present invention may be implemented by hardware, firmware, software, or a combination thereof.

According to hardware implementation, the method according to the embodiments of the present invention may be implemented using Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors.

According to firmware or software implementation, the method according to the embodiments of the present invention may be implemented in the form of a module, a procedure or a function to perform the above functions or operation. A software code is stored in a memory unit so that the software code may be driven by a processor. The memory unit may be located inside or outside the processor to exchange data with the processor by various know means. The wireless communication system according to an embodiment of the present invention will be described with reference to FIG. 21.

Figure 21:
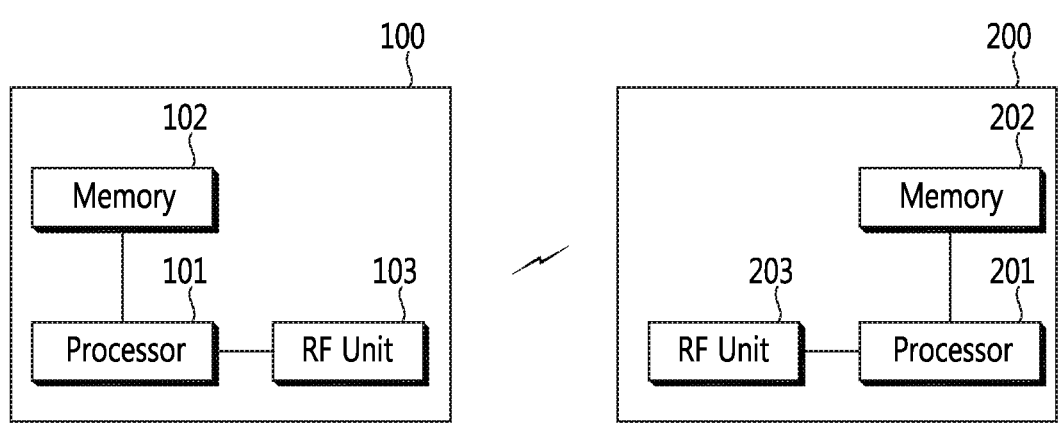
FIG. 21 is a block diagram illustrating a wireless communication system according to an embodiment of the present invention.

FIG. 21 is a block diagram illustrating a wireless communication system according to an embodiment of the present invention.

A base station 200 includes a processor 201, a memory 202, and a radio frequency (RF) unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

A wireless device 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method. An operation of the wireless 100 according to the above embodiment may be implemented by the processor 201.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module (procedure, function, and the like) to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A user equipment (UE) comprising:
   a first radio frequency (RF) chain configured to process a first reception signal and a second reception signal;
   a second RF chain configured to process a transmission signal;
   a duplexer to output the first reception signal to the first RF chain and to output the second reception signal to the second RF chain;
   a directional coupler connected between the duplexer and the second RF chain to output the transmission signal from the second RF chain to the duplexer and to output the second reception signal input from the duplexer to the first RF chain;
   a self-interference removing filter connected to the directional coupler and configured to remove the transmission signal from the second RF chain leaking into the second reception signal input from the directional coupler to output the second reception signal; and
   an accumulator connected to the self-interference removing filter and the first RF chain and configured to accumulate the second reception signal output from the self-interference removing filter and the first reception signal and to input an accumulated signal to the first RF chain.

2. The UE of claim 1, wherein the first RF chain comprises:
   a first low-noise amplifier to amplify the accumulated signal obtained by accumulating the first reception signal and the second reception signal by the accumulator, and
   a first composition unit connected to the low-noise amplifier to remove a carrier from the amplified signal and output a signal.

3. The UE of claim 2, wherein the first RF chain further comprises a filter to remove an unnecessary component from the carrier-removed signal from the first composition unit.

4. The UE of claim 1, wherein the second RF chain comprises:
   a second composition unit to compose a baseband signal with a carrier, and
   an amplifier to amplify an output signal from the second composition unit.

5. The UE of claim 4, wherein the second RF chain further comprises a filter to
   output the baseband signal to the second composition unit by removing an unnecessary component from the baseband signal.

6. The UE of claim 1, further comprising a second low-noise amplifier connected between the self-interference removing filter and the accumulator to amplify the second reception signal output from the self-interference removing filter and to transmit the amplified second reception signal to the accumulator.

7. The UE of claim 6, wherein the first RF chain comprises a first low-noise amplifier to amplify the first reception signal, the accumulator to accumulate the first reception signal passing through the first low-noise amplifier and the second reception signal passing through the second-low noise amplifier, and a composition unit to remove a carrier from a signal obtained by accumulating the first reception signal and the second reception signal by the accumulator and to output a signal.

8. The UE of claim 1, wherein the first reception signal is a reception signal from a base station, the second reception signal is a device-to-device (D2D) reception signal from an adjacent UE, and the transmission signal comprises at least one of a transmission signal to the base station or a D2D transmission signal to the adjacent UE.

9. A transceiving method of a user equipment (UE) comprising:
   receiving, by a first radio frequency (RF) chain of the UE, at least one of a first reception signal and a second reception signal;
   processing and transmitting, by a second RF chain of the UE, a transmission signal;
   outputting, by a directional coupler of the UE, the transmission signal from the second RF chain to a duplexer and outputting the second reception signal input from the duplexer to the first RF chain,
   removing, by a self-interference removing filter of the UE, the self-interference removing filter connected to the directional coupler, the transmission signal leaking into the second reception signal when transmission of the transmission signal is performed simultaneously with reception of the second reception signal; and
   accumulating, by an accumulator of the UE, the first reception signal and the second reception signal and processing the accumulated first and second reception signals when the first and second reception signals are received simultaneously.

10. The transceiving method of claim 9, wherein the first reception signal is a reception signal from a base station, the second reception signal is a device-to-device (D2D) reception signal from an adjacent UE, and the transmission signal comprises at least one of a transmission signal to the base station or a D2D transmission signal to the adjacent UE.

* * * * *